US009165345B2

(12) United States Patent
Hutchison et al.

(10) Patent No.: US 9,165,345 B2
(45) Date of Patent: Oct. 20, 2015

(54) METHOD AND SYSTEM FOR NOISE REDUCTION IN VIDEO SYSTEMS

(71) Applicant: DRS RSTA, INC., Melbourne, FL (US)

(72) Inventors: David C. Hutchison, Plano, TX (US); Douglas A. Blettner, Dallas, TX (US); Henry W. Neal, Allen, TX (US); Alfredo Mendez, Jr., Flower Mound, TX (US)

(73) Assignee: DRS Network & Imaging Systems, LLC, Melbourne, FL (US)

(*) Notice: Subject to any disclaimer, the term of this patent is extended or adjusted under 35 U.S.C. 154(b) by 30 days.

(21) Appl. No.: 14/208,938

(22) Filed: Mar. 13, 2014

(65) Prior Publication Data

US 2014/0270568 A1    Sep. 18, 2014

Related U.S. Application Data

(60) Provisional application No. 61/785,028, filed on Mar. 14, 2013.

(51) Int. Cl.
| | |
|---|---|
| *G06K 9/40* | (2006.01) |
| *G06T 5/00* | (2006.01) |
| *G06T 5/50* | (2006.01) |
| *H04N 7/01* | (2006.01) |

(52) U.S. Cl.
CPC . *G06T 5/002* (2013.01); *G06T 5/50* (2013.01); *G06T 2207/10016* (2013.01); *G06T 2207/20216* (2013.01); *H04N 7/0117* (2013.01)

(58) Field of Classification Search
CPC ........... G06T 5/00; G06T 5/001; G06T 5/002; G06T 5/004; G06T 5/20; G06T 5/40; G06T 5/50; G06T 2207/10016; G06T 2207/20216; H04N 1/4092; H04N 7/0117; G06K 9/74; G06K 9/745
See application file for complete search history.

(56) References Cited

U.S. PATENT DOCUMENTS

| | | | | |
|---|---|---|---|---|
| 4,551,753 | A * | 11/1985 | Nishizawa et al. | 348/446 |
| 5,204,741 | A * | 4/1993 | Sakaguchi | 348/208.6 |
| 5,442,407 | A | 8/1995 | Iu | |
| 6,760,486 | B1 * | 7/2004 | Chiao et al. | 382/274 |
| 6,847,737 | B1 * | 1/2005 | Kouri et al. | 382/260 |
| 7,023,487 | B1 * | 4/2006 | Adams | 348/448 |
| 7,444,034 | B1 * | 10/2008 | Thistle et al. | 382/254 |
| 7,660,439 | B1 * | 2/2010 | Lu et al. | 382/107 |

(Continued)

OTHER PUBLICATIONS

International Search Report and Written Opinion mailed Sep. 16, 2014 in Int'l Patent Application No. PCT/US2014/026265, 11 pages.

(Continued)

*Primary Examiner* — Amir Alavi
(74) *Attorney, Agent, or Firm* — Kilpatrick Townsend & Stockton LLP

(57) ABSTRACT

A system and method of image processing is provided, including implementing adaptive pixel replacement techniques or reducing noise. The method includes obtaining a data map of an image frame, wherein the data map comprises good pixels and bad pixels at locations associated with the data map. The method also includes assigning different techniques to the bad pixels, wherein a first technique is assigned to a first bad pixel and a second technique is assigned to a second bad pixel. The method further includes adjusting information associated with the bad pixels for a chosen technique for each of the bad pixels.

20 Claims, 19 Drawing Sheets

(56) References Cited

U.S. PATENT DOCUMENTS

| | | |
|---|---|---|
| 8,077,969 B2 * | 12/2011 | Rossato et al. ............... 382/173 |
| 2004/0179108 A1 | 9/2004 | Sorek et al. |
| 2009/0316009 A1 | 12/2009 | Ito et al. |
| 2012/0275710 A1 | 11/2012 | Peng et al. |
| 2014/0270562 A1 * | 9/2014 | Neal et al. .................... 382/254 |
| 2014/0270568 A1 * | 9/2014 | Hutchison et al. ............ 382/264 |

OTHER PUBLICATIONS

Invitation to Pay Additional Fees and Partial Search Report mailed Jul. 7, 2014 in Int'l Patent Application No. PCT/US2014/026265, 2 pages.

* cited by examiner

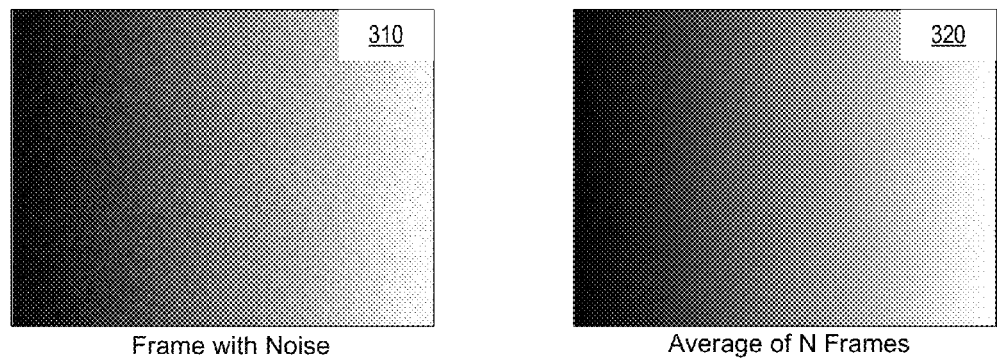
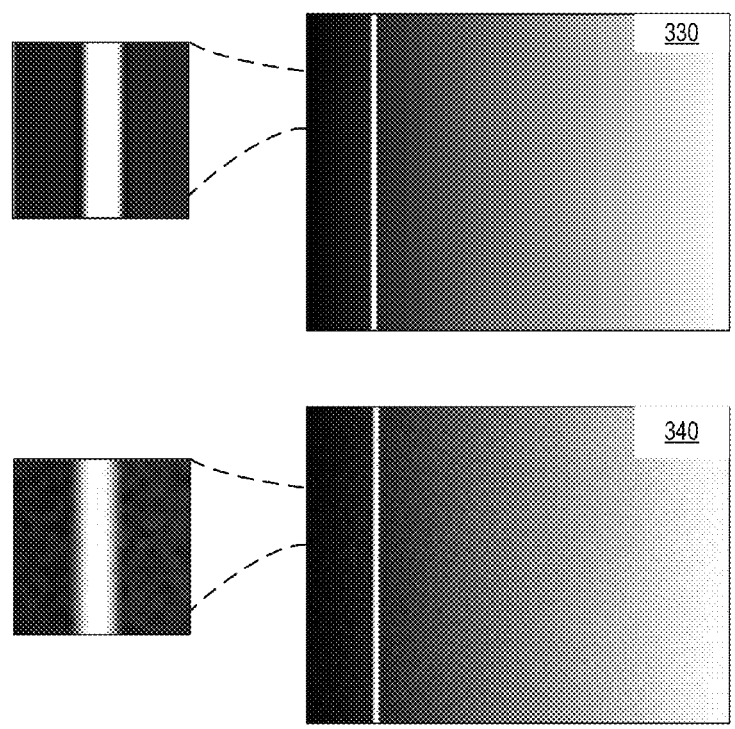
FIG. 3

Adjust Pixel Values Based on Mask

| | 1 | 2 | 3 | 4 | 5 | 6 | 7 |
|---|---|---|---|---|---|---|---|
| | P28 | P29 | P30 | P31 | P32 | P33 | P34 |
| | P27 | P11 | P12 | P* | P14 | P15 | P35 |
| | P26 | P10 | P* | P* | P* | P16 | P36 |
| 4 | P25 | P9 | P* | P9 | P* | P* | P37 |
| | P* | P* | P* | P* | P* | P18 | P38 |
| | P47 | P23 | P22 | P43 | P20 | P19 | P39 |
| | P46 | P45 | P44 | P43 | P42 | P41 | P40 |

1130

Pixel Values:

...

[4, 1] = P25

[4, 2] = P9

[4, 3] = adjust pixel value associated with local average pixel replacement technique
= average of pixel values from P9 and P10

[4, 4] = adjust pixel value associated with left good pixel replacement technique
= P9

[4, 5] = adjust pixel value associated with local average pixel replacement technique
= average of pixel values from P16 and P18

[4, 6] = adjust pixel value associated with local average pixel replacement technique
= average of pixel values from P16, P36, P37, P38, and P18

| | 1 | 2 | 3 | 4 | 5 |
|---|---|---|---|---|---|
| 1 | P11 | P12 | P13 | P14 | P15 |
| 2 | P10 | P2 | P3 | P4 | P16 |
| 3 | P9 | P1 | P0 | P5 | P17 |
| 4 | P24 | P8 | P7 | P6 | P18 |
| 5 | P23 | P22 | P21 | P20 | P19 |

Data Map — 1270

| | 1 | 2 | 3 | 4 | 5 |
|---|---|---|---|---|---|
| 1 | 0 | 0 | 0 | 0 | 0 |
| 2 | 0 | 0 | 1 | 1 | 0 |
| 3 | 0 | 0 | 1 | 0 | 0 |
| 4 | 0 | 1 | 0 | 0 | 0 |
| 5 | 0 | 0 | 0 | 0 | 0 |

Local Average Pixel Replacement Technique — 1280

| | 1 | 2 | 3 | 4 | 5 |
|---|---|---|---|---|---|
| 1 | P11 | P12 | P13 | P14 | P15 |
| 2 | P10 | P2 | P* | P* | P16 |
| 3 | P9 | P1 | P* | P5 | P17 |
| 4 | P24 | P* | P7 | P6 | P18 |
| 5 | P23 | P22 | P21 | P20 | P19 |

Adjust Pixel Values Based on Mask — 1290

Pixel Values for Good and Bad Pixels After Adjustment Associated with Local Average Pixel Replacement Technique:

...

[2, 1] = P10

[2, 2] = P2

[2, 3] = adjust pixel value associated with local average pixel replacement technique
= average of pixel values from P1, P2, P12, P13, P14, and P5

[2, 4] = adjust pixel value associated with local average pixel replacement technique
= average of pixel values from P13, P14, P15, P16, P17, and P5

METHOD AND SYSTEM FOR NOISE REDUCTION IN VIDEO SYSTEMS

CROSS-REFERENCES TO RELATED APPLICATIONS

This application claims priority to U.S. Provisional Patent Application No. 61/785,028, filed Mar. 14, 2013, entitled "Method and System for Noise Reduction in Video Systems," the disclosure of which is hereby incorporated by reference in its entirety for all purposes.

BACKGROUND OF THE INVENTION

A system can receive poor quality images of an object. For example, when the object is moving, the image produced by the system can be blurry. In another example, pixels associated with the image can show inappropriate brightness levels. Therefore, there is a need in the art for improved image processing.

SUMMARY OF THE INVENTION

Embodiments of the system relate generally to image processing. More specifically, embodiments of the present invention relate to methods and systems for processing data to achieve noise reduction in image frames and/or generating an adaptive pixel replacement mask for replacing a plurality of pixel values associated with an image frame.

According to an embodiment of the present invention, a method of processing data for an image frame is provided. Merely by way of example, the invention has been applied to a method. The method includes receiving a plurality of input frames including a current frame; providing the current frame to a first multiplier, to a frame averaging module, and to a first low pass filter; after the current frame is provided to a first low pass filter, detecting at least a portion of the current frame that includes motion; generating a mask frame associated with the portion of the current frame that includes the motion detection; providing the mask frame to a second low pass filter; after the current frame is provided to the frame averaging module, averaging the current frame and one or more stored frames to generate an averaged current frame; providing the averaged current frame to a second multiplier; and generating an output frame based at least in part on the averaged current frame and the current frame after the first multiplier.

The plurality of current frames can include one or more image frames from an input video stream. The first low pass filter may be a temporal low pass filter and the second low pass filter may be a spatial low pass filter. The method may include, after the mask frame is provided to the second low pass filter, generating a matrix of pixel values associated with motion in one or more pixels in the current frame, and providing the matrix of pixel values to the first multiplier. The method may include providing the matrix of pixel values to an inverting module, wherein the inverting module inverts the polarity of the matrix of pixel values. Averaging the current frame may be implemented using an addition technique, an infinite impulse response (IIR) filter, or an alpha blend. The motion detection of the portion of the current frame may be implemented by comparing the current frame with the one or more stored frames. The method may include receiving the plurality of input frames from a user; and providing the output frame to the user. The output frame may be generated by combining the averaged current frame and the current frame after the first multiplier. The mask frame may include a rational number between 0 and 1 for a plurality of pixels in the current frame. At least three stored frames may be averaged with the current frame to generate the averaged current frame.

According to another embodiment of the present invention, a method of processing data for an image frame is provided. Merely by way of example, the invention has been applied to a method. The method includes receiving a plurality of input frames including a current frame; providing the current frame to a frame multiplexor, to a frame averaging module, and to a first low pass filter; after the current frame is provided to a first low pass filter, detecting at least a portion of the current frame that includes motion; generating a mask frame associated with the portion of the current frame that includes the motion detection; providing the mask frame to a second low pass filter; calculating a motion value associated with the mask frame; comparing the motion value with a threshold; averaging the current frame and one or more stored frames to generate an averaged current frame; providing the averaged current frame to the frame multiplexor; and generating an output frame based at least in part on the averaged current frame and the current frame after the first multiplexor.

The plurality of current frames can include one or more image frames from an input video stream. The first low pass filter may be a temporal low pass filter and the second low pass filter may be a spatial low pass filter. The method may include, after the mask frame is provided to the second low pass filter, generating a matrix of pixel values associated with motion in one or more pixels in the current frame, and providing the matrix of pixel values to the first multiplier. The method may include providing the matrix of pixel values to an inverting module, wherein the inverting module inverts the polarity of the matrix of pixel values. Averaging the current frame may be implemented using an addition technique, an infinite impulse response (IIR) filter, or an alpha blend. The motion detection of the portion of the current frame may be implemented by comparing the current frame with the one or more stored frames. The method may include receiving the plurality of input frames from a user; and providing the output frame to the user. The output frame may be generated by combining the averaged current frame and the current frame after the first multiplier. The mask frame may include a rational number between 0 and 1 for a plurality of pixels in the current frame. At least three stored frames may be averaged with the current frame to generate the averaged current frame.

According to an embodiment of the present invention, a method of processing data for an image frame is provided. Merely by way of example, the invention has been applied to a method of frame averaging. The method includes receiving a plurality of frames; calculating a coefficient associated each frame in the plurality of frames, to generate a plurality of coefficients; summing the plurality of coefficients, to generate a value for each pixel; comparing the value for each pixel to a threshold, to generate a comparison value; and determining an averaging technique based on the comparison value.

According to another embodiment of the present invention, a system is provided. The system includes a processor and a computer readable medium coupled to the processor. The computer readable medium can comprise instructions that cause the processor to implement a method. The method may include one or more methods described herein.

According to an embodiment of the present invention, a method of replacing a pixel associated with an image frame is provided. Merely by way of example, the invention has been applied to a method. The method includes obtaining a data map of the image frame, wherein the data map comprises good pixels at a first set of locations associated with the data map and bad pixels at a second set of locations associated with the data map, and wherein the bad pixels includes a first bad pixel and a second bad pixel; identifying one or more pixel replacement techniques to generate the adaptive pixel replacement mask, wherein the one or more pixel replacement techniques includes a first pixel replacement technique and a second pixel replacement technique; assigning the first pixel replacement technique to the first bad pixel in the adaptive pixel replacement mask; assigning the second pixel replacement technique to the second bad pixel in the adaptive pixel replacement mask, wherein the second pixel replacement technique is different from the first pixel replacement technique; adjusting a first pixel value associated with the first bad pixel using the first pixel replacement technique; and adjusting a second pixel value associated with the second bad pixel using the second pixel replacement technique.

According to an embodiment of the present invention, the first pixel replacement technique and the second bad pixel replacement technique comprise at least one of left good pixel, right good pixel, local average, spiral search, upper replacement, or lower replacement. The first technique may be a local average technique and the second technique may be a spiral search technique. The data map may be updated in real time. In some embodiments, the first pixel replacement technique is assigned to the first bad pixel and the second pixel replacement technique is assigned to the second bad pixel is conducted during a calibration process.

According to an embodiment of the present invention, the method may further comprise analyzing a plurality of pixels of the data map, wherein the plurality of pixels includes the first pixel and the second pixel in a single row, and the first pixel and a third pixel in a single column; and when the first pixel, the second pixel, and the third pixel are bad pixels, assigning spiral search as the first pixel replacement technique for the first pixel.

According to an embodiment of the present invention, the method may further comprise analyzing a plurality of pixels of the data map, wherein the plurality of pixels includes the first pixel and the second pixel in a single row, and the first pixel and a third pixel in a single column; and when the first pixel and the second pixel are bad pixels and the third pixel is a good pixel, assigning local average as the first pixel replacement technique for the first pixel.

According to an embodiment of the present invention, the method may further comprise analyzing a plurality of pixels of the data map, wherein the plurality of pixels includes the first pixel, the second pixel, a third pixel, and a fourth pixel, wherein the second pixel, the third pixel, and the fourth pixel are directly next to the first pixel; and when the second pixel, the third pixel, and the fourth pixel are bad pixels, assigning spiral search as the first pixel replacement technique for the first pixel.

According to an embodiment of the present invention, the method may further comprise analyzing a plurality of pixels of the data map, wherein the plurality of pixels includes the first pixel, the second pixel, a third pixel, and a fourth pixel, wherein the first pixel, the second pixel, the third pixel, and the fourth pixel are horizontally aligned in a row on the data map, and wherein the first pixel is to the left of the second pixel, the second pixel is to the left of the third pixel, and the third pixel is to the left of the fourth pixel. When the first pixel is a good pixel and the second pixel, the third pixel, and the fourth pixel are bad pixels, and when the plurality of pixels of the data map that are above and below the second pixel are bad pixels, assigning left good pixel as the second pixel replacement technique for the second pixel.

According to an embodiment of the present invention, a system for adjusting one or more pixel values in a data map is provided. Merely by way of example, the system includes a processor and a computer readable medium coupled to the processor, the computer readable medium comprising instructions that cause the processor to implement a method. The method comprising obtain the data map of an image frame, wherein the data map comprises good pixels at a first set of locations associated with the data map and bad pixels at a second set of locations associated with the data map; for a current pixel in the data map, conduct a pixel analysis comprising: identify that the current pixel is a bad pixel, identify that all pixels directly next to the current pixel are bad pixels, measure a first distance to a good left pixel, measure a second distance to a good right pixel, measure a third distance to a good upper pixel, measure a fourth distance to a good lower pixel, and compare the first distance, second distance, third distance, and fourth distance, when the first distance to the good left pixel is the shortest distance, identify a left good pixel replacement technique for the current pixel; and assign the left good pixel replacement technique for the current pixel in an adaptive pixel replacement mask.

According to an embodiment of the present invention, different pixel replacement techniques can be selected from the group comprising at least one of left good pixel, right good pixel, local average, spiral search, upper replacement, or lower replacement. In an embodiment, the first technique can be a local average technique and the second technique is a spiral search technique.

According to another embodiment of the present invention, a system is provided. The system includes a processor and a computer readable medium coupled to the processor. The computer readable medium can comprise instructions that cause the processor to implement a method. The method may include one or more methods described herein.

According to another embodiment of the present invention, a system is provided. The system includes a processor and a computer readable medium coupled to the processor. The computer readable medium can comprise instructions that cause the processor to implement a method. The method may include one or more methods described herein.

Numerous benefits are achieved by way of the present invention over conventional techniques of noise reduction in image processing. For example, a high signal to noise ratio is achieved in image frames or portions of image frames that are still (e.g., no motion) while providing superior motion rendering where motion has been detected. Moreover, the system can be adaptive to the level of motion received in the video input.

Numerous benefits are also achieved by way of the present invention over conventional techniques of applying pixel replacement techniques. For example, the selection of the optimal bad pixel replacement technique can result in the best image quality for digital images and the greatest sensor yield. This may be advantageous when a sensor imperfectly displays information for pixels in a digital camera. Moreover, corner cases and larger defects in an image frame can be fixed with larger kernels or different techniques that a single replacement technique may not completely fix. Further, fewer resources may be required when some embodiments utilize smaller kernel sample sizes for adaptive pixel replacement techniques. These and other embodiments of the invention along with many of its advantages and features are described in more detail in conjunction with the text below and attached figures.

BRIEF DESCRIPTION OF THE DRAWINGS

FIG. 3 is a high level diagram illustrating noise reduction through averaging and adaptive frame imaging according to an embodiment of the invention;

FIGS. 11, 11A, 11B, and 11C are high level schematic diagrams illustrating an adaptive pixel replacement technique for a plurality of pixels according to an embodiment of the present invention;

FIG. 12A is a high level schematic diagram illustrating a left good pixel replacement technique according to an embodiment of the present invention;

FIG. 12B is a high level schematic diagram illustrating a spiral search pixel replacement technique according to an embodiment of the present invention;

FIG. 12C is a high level schematic diagram illustrating a local average pixel replacement technique according to an embodiment of the present invention;

DETAILED DESCRIPTION OF SPECIFIC EMBODIMENTS

Embodiments of the present invention relate to image processing. More particularly, embodiments of the present invention relate to systems and methods for processing data associated with images in order to reduce noise in a current image frame. A mask can be produced using a first multiplier, frame averaging module, and low pass filter. An averaged value of the frame can be provided to a second multiplier to produce the mask and create an output image frame.

Embodiments of the present invention also relate to systems and methods for replacing a plurality of pixel values associated with an image frame. A data map of the image frame can be obtained that comprises good and bad pixels at particular locations associated with the data map. One or more pixel replacement techniques can be identified to generate an adaptive pixel replacement mask, where a first pixel replacement technique is used for a first bad pixel and a second pixel replacement technique is used for a second bad pixel. The corresponding pixel replacement techniques can be assigned to the bad pixels and the pixel value for the bad pixel can be adjusted using the corresponding pixel replacement technique.

Embodiments of the present invention, along with many of their advantages and features, are described in more detail in conjunction with the text below and its related figures.

I. Overview of Image Processing

Figure 1:
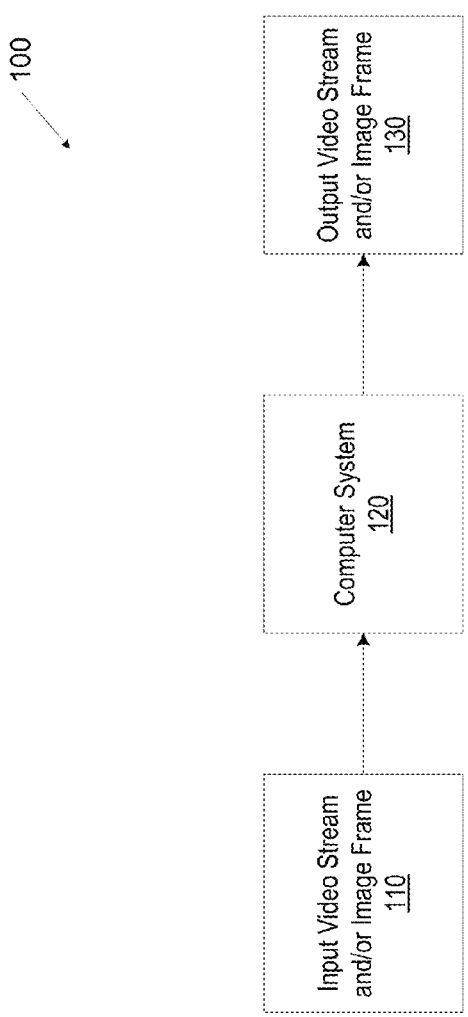
FIG. 1 is a high level schematic diagram illustrating a system for processing images according to an embodiment of the present invention.

FIG. 1 is a high level schematic diagram illustrating a system for processing images according to an embodiment of the present invention. The system 100 includes an input video stream and/or image frame 110, a computer system 120, and an output video stream and/or image frame 130.

The input video stream and/or image frame 110 may be a series of image frames, raw image files, pixels, stream of data, or other information associated with input data for one or more images. The input video stream and/or image frame 110 can include additional data that helps describe the image data as well, including a data map comprising good pixels and bad pixels in the image frame. The input video stream and/or image frame 110 can be received via a network, wired or wireless connection, or other medium of data transfer.

The computer system 120 may process the input video stream and/or image frame 110. In some examples, the computer system 120 can be used to reduce the amount of noise in a series of images from the input video stream. In some examples, the computer system 120 can be used to identify good or bad pixels in the image frame and/or data map and replace the pixel value of those bad pixels with other pixel values. The computer system may use one or more pixel replacement techniques to determine an optimized pixel replacement technique for a particular pixel.

The output video stream and/or image frame 130 may be a series of updated, adjusted, altered, or analyzed image frames, raw image files, pixels, stream of data, or other information associated with input data for one or more images. The output video stream and/or image frame 130 can include higher quality image frames and/or image data than the information received in the input video stream and/or image frame 110.

II. Noise Reduction

Embodiments of the present invention relate generally to image processing. More specifically, embodiments of the present invention relate to methods and systems for detecting motion and applying frame integration strategies based on the level of motion detected. One embodiment may use a motion detection algorithm to determine areas in an image where motion is appearing. This motion area can be adjusted (e.g., via a low pass filter) to expand the area and to allow for a smooth transition between a still image area and the area where motion is applied. This result can be used as a mask to determine how much image integration to use. In areas predominantly still, one type of frame integration algorithm could be used. In areas predominantly with motion, either no image integration could be used or an image integration algorithm optimized towards motion could be utilized. Another embodiment may implement various frame integration methods and configuration settings based on the levels of motion detected.

Embodiments can improve the signal to noise ratio for static portions of a video image, while maintaining a good representation of motion depicted in the motion area of the video image. The identified motion area can be low pass filtered to expand the area and to allow for a smooth transition between the still image area and the area where motion is applied. This result can be used as a mask to determine how much image integration to use. In areas predominantly still, a true (e.g., traditional) frame integration algorithm could be used. In areas predominantly with motion, either no image integration could be used, or an image integration algorithm optimized towards motion could be utilized.

Embodiments of the present invention may use the motion detected in a plurality of frames to determine the algorithm to add the plurality of frames together. Parameters of the method may be adjusted, including the parameters of how many frames are integrating, what method of integration the computer system determines to use, and what the settings for the different filters are depending on how much motion is detected.

Most digital imaging systems capture a noise component, or a random variation of brightness or color information in the image that was not present in the object imaged. This noise component can be seen in a resultant output frame based on the signal to noise ratio. When the signal to noise ratio is very high, the noise component may not be noticeable to the user. When the signal to noise ratio is very low, the noise captured in the system can become objectionable.

An imaging system may attempt to fix the noise seen in an output image by using frame integration. Frame integration can be conducted by incorporating multiple exposures of a scene into an output frame. Since the noise is a signal with random characteristics, the noise signal can be added together at a slower rate than the actual signal. Thus, after several image frames are added during frame integration, the signal to noise ratio can be increased and any motion of objects that occur during the frame integration can be blurred. Various forms for frame integration exist that blend consecutive frames in various ways in an attempt to improve motion rendition while still providing some signal to noise ratio improvement. Each of these techniques can be implemented in an inter-frame solution or in an intra-frame solution.

Figure 2:
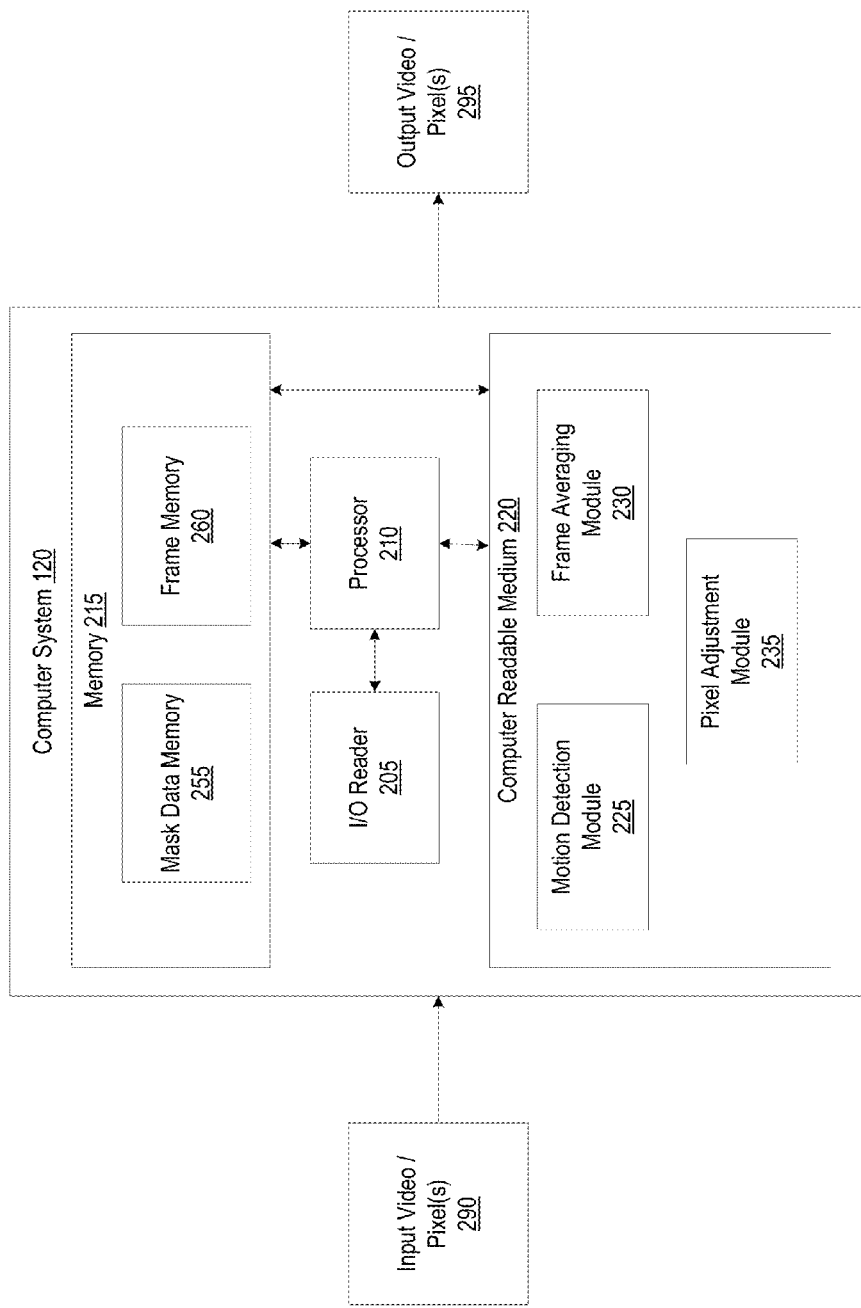
FIG. 2 is a high level schematic diagram illustrating a system for processing images according to an embodiment of the present invention.

FIG. 2 is a high level schematic diagram illustrating a system for processing images according to an embodiment of the present invention. As illustrated in FIG. 2, a computer system 120 may comprise an I/O (input/output) reader 205, processor 210, memory 215, and computer readable medium 220. The memory 215 can comprise multiple portions of memory, including a mask data memory 255 and frame memory 260. The computer readable medium 220 can comprise multiple pieces of hardware or software modules, including a motion detection module 225, frame averaging module 230, and pixel adjustment module 235. One or more modules, including the motion detection module 225, frame averaging module 230, and/or the pixel adjustment module may access memory 215 (e.g., directly or through processor 210).

The I/O (input/output) reader 205 includes one or more sources of data through various types of I/O devices. I/O devices can include keyboards, modems, network interfaces, printers, scanners, video cameras, or other devices well known in the art. Typically, I/O devices are coupled to a system bus through I/O controllers (e.g., a Universal Serial Bus ("USB") adapter for controlling USB peripherals or other type of bus adapter).

The processor 210 includes control logic using hardware (e.g. an application specific integrated circuit or field programmable gate array) and/or using computer software with a generally programmable processor in a modular or integrated manner. As used herein, a processor includes a multicore processor on a same integrated chip or multiple processing units on a single circuit board or networked. An interconnection via system bus allows the processor 210, which may include one or more processors, to communicate with each subsystem and to control the execution of instructions from memory 215.

The memory 215 may store program instructions that are loadable and executable on the processor 210, as well as data generated during the execution of these programs. Depending on the configuration and type of computing device, the memory may be volatile (e.g., random access memory (RAM)) and/or non-volatile (e.g., read-only memory (ROM), flash memory). The computing device may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The computer readable medium 220 includes hardware, software code, modules, or other information. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium 220 may be any combination of such storage or transmission devices.

In some embodiments, the computer readable medium 220 can be implemented as video acceleration fabric, field-programmable gate array (FPGA) fabric, or application-specific integrated circuit (ASIC) to perform an operation at a hardware level. The video acceleration fabric can include control logic in one or more processor chips, open multimedia applications platform (OMAP®) chips, Freescale® chip, etc. The video acceleration fabric can be used to adjust, analyze, or implement one or more actions to pixels in an input video stream and/or image frame.

A motion detection module 225 may be implemented. For example, the motion detection module 225 can conduct a frame-by-frame comparison of the image frames to determine where motion has occurred (e.g., in the input video stream). In some examples, the computer readable medium 220 can include a motion detection module 225 with the manufacturing of the computer readable medium 220, like with an OMAP® chip. The OMAP® chip can include a video acceleration module that can identify motion detection (e.g., for motion detection algorithms). The output of the motion detection module 225 can identify an image frame of the pixels or a vector identifying one or more pixels that are associated with motion.

The motion detection module 225 may access memory 215. For example, the motion detection module 225 can access the frame memory 260 to receive the current frame and a previous frame, in order to detect motion between the two frames. The determined motion detection can be stored in the frame memory 260 as well. The motion detection module 225 may also access the mask data memory 255 to store information relating to the portions of the frame that include motion and/or prevent averaging from occurring at those frames (e.g., by applying a mask to those portions and storing corresponding information with the mask data memory 255).

A frame averaging module 230 may be implemented. For example, the frame averaging module 230 may apply a filter technique (e.g., noise correction filter). Various frame averaging techniques may be implemented, including an addition technique (e.g., one or more pixel values in two frames are added and divided by two), an infinite impulse response (IIR) filter, alpha blend (e.g., the current frame and the previous frame carry more weight than other frames), or other frame integration techniques known in the industry.

The frame averaging module 230 may access memory 215. For example, the frame averaging module 230 can access a frame memory 260 to receive a current frame, an image frame other than the current frame in a plurality of frames, or information about a frame (e.g., the total number of frames, the bit rate, etc.).

A pixel adjustment module 235 may be implemented. For example, the pixel adjustment module 235 can be configured to implement the math and/or algorithms associated with adjusting one or more pixels in the image frame. The pixel adjustment module 235 can be configured to receive a current frame and/or pixels associated with a current frame and provide the current frame to one or more multipliers, subtracting module, adding modules, inverting module (e.g., inversion of polarity), averaging modules, or other modules. The pixel adjustment module 235 may also be configured to average a frame (e.g., using a current frame and one or more stored frames).

The pixel adjustment module 235 may access memory 215. For example, the pixel adjustment module 235 can access a frame memory 260 to store adjusted pixel information for the pixels in the image frame. The information may include the results of a first multiplier, frame averaging module, low pass filter(s), motion detection, or other information that is used to adjust the current frame during the process.

FIG. 3 is a high level diagram illustrating noise reduction through averaging and adaptive frame imaging according to an embodiment of the invention. As illustrated in FIG. 3, an image frame with noise 310 is compared with an image frame with reduced noise 320. The noise can be received from various sources, including known principles of physics (e.g., errors in transmission, signal degradation). Frame averaging can be applied to the frame to improve the signal to noise ratio to get a better representation of the original image before the noise was added to the signal/frame. An image frame with reduced noise 320 may be generated with a reduction in noise using one or more systems or methods described herein.

When the difference between a first frame and a second frame includes movement of one or more objects in the image frame, the objects in the image frame can become blurred with a standard frame averaging technique. For example, a first frame 330 can include a bar moving at some velocity. In a second frame 340, the bar can be in a different location occupying different pixels. The movement of the bar from one location to another location can depict movement. In a non-motion adaptive frame imaging technique, the bar can move from its location in the first frame 330 to a second location in the second frame 340, but the edges of the bar can become blurred.

Embodiments of the invention attempt to solve these and other problems by detecting the edges of the image (e.g., the edges of the bar in the first frame 330 and second frame 340) and using those edges to generate a mask frame. The mask frame may be used to help remove noise from the image frame and appropriately blur portions of the image frame by identifying a frame averaging technique, an absolute difference algorithm, other averaging techniques, or no frame averaging to apply to one or more frames.

Figure 4:
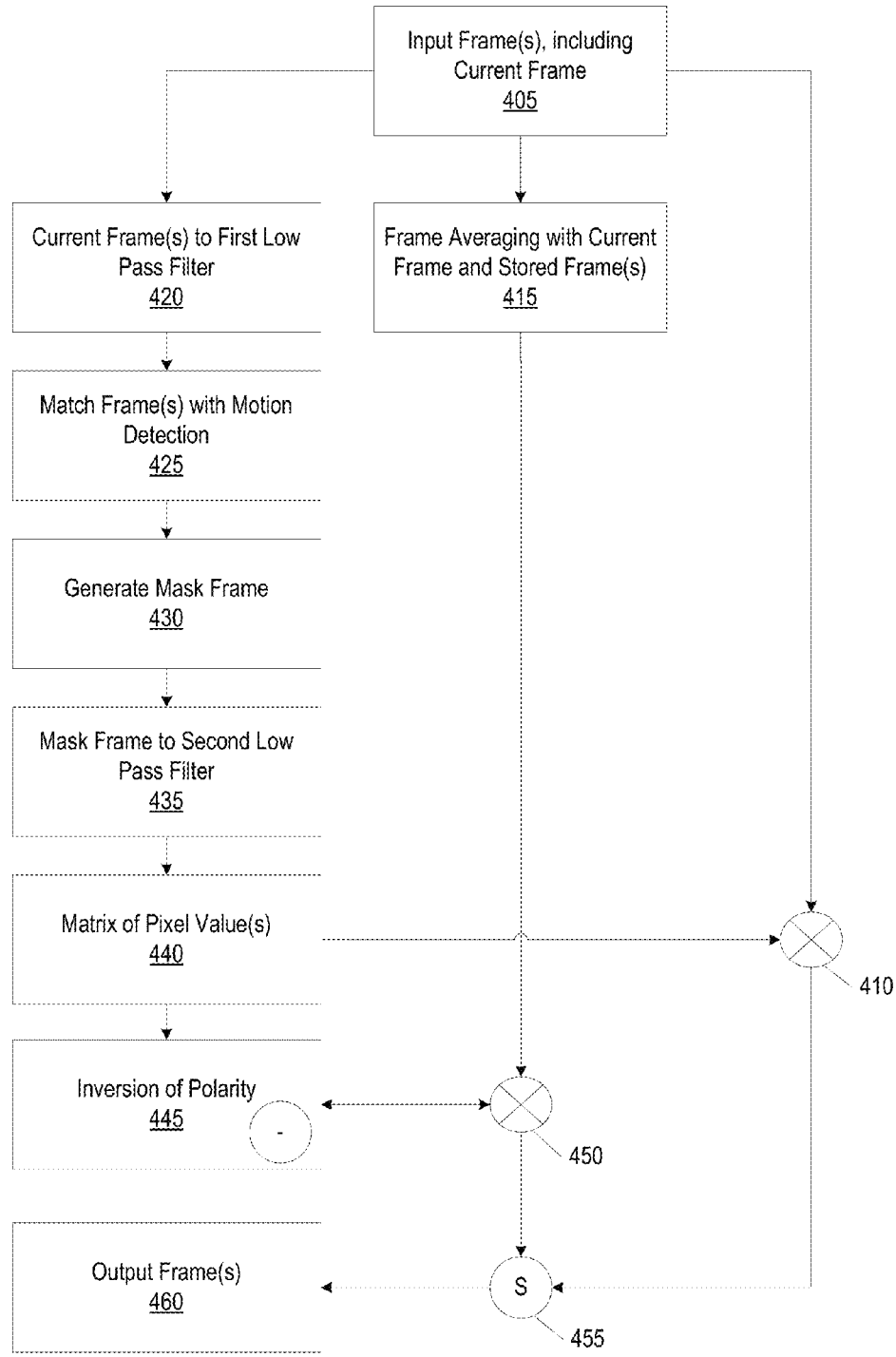
FIG. 4 is a high level schematic diagram illustrating a system for processing images using frame averaging according to an embodiment of the present invention.

FIG. 4 is a high level schematic diagram illustrating a system for processing images using frame averaging according to an embodiment of the present invention. As illustrated in FIG. 4 at block 405, an input frame(s) including the current frame is received. The current frame may include an input video stream, one or more image frames, or image data (e.g., width, height, 3-dimensional frame rate, real-time video rate, high frame rate). In some embodiments, the input frame including the current frame is received from an infrared (IR) sensor. For example, the IR sensor can measure IR light (e.g., heat, energy, etc.) radiating from objects in its field of view.

The current frame can be provided to one or more modules. The current frame may be provided in parallel to the modules, which can increase the efficiency of processing the current frame. One or more of the modules may access memory (e.g., the frame averaging module may access the frame memory). In some embodiments, the current frame is provided to a first multiplier, to a frame averaging module, and to a first low pass filter.

At block 410, the current frame is provided to a first multiplier. One input for the first multiplier is the current frame and a second input for the first multiplier is identified at block 440. The two inputs for the first multiplier can generate a combination of the motion and no motion values at a pixel-by-pixel basis (e.g., each pixel in the current frame may be represented in a rational number between 0.0 and 1.0). In an embodiment, a current frame in the plurality of frames or the frame average can be provided to the first multiplier, instead of pixels on a pixel-by-pixel basis.

At block 415, the current frame is provided to a frame averaging module. Frame averaging may be applied to one or more input frames to combine the values. When no motion is detected and the current frame is averaged, the frame averaging module can help to reduce noise. When motion is detected and the current frame is averaged, the image may become blurred.

One or more averaging techniques may be applied to an image frame while frame averaging. For example, a temporal average can be applied to the current frame and one or more stored frames (e.g., "n" frames). Other frame averaging techniques may be implemented, including an addition technique (e.g., one or more pixel values in two frames are added and divided by two), an infinite impulse response (IIR) filter, alpha blend (e.g., the current frame and the previous frame carry more weight than other frames), or other frame integration techniques known in the industry.

In some examples, the frame averaging may average the current frame and one or more stored frames. The frame averaging can include a selectable number of frames (e.g., 4 frames) so that each frame includes one-fourth of the total weight of output frame. Similarly, the frame memory may include a rolling history of the previous three frames and the current frame is averaged with the three stored frames. The four frames can be averaged to generate the averaged current frame. The contribution of the oldest frame (e.g., the fifth frame) can be subtracted from the weighted average of the four remaining frames that includes the current frame.

At block 420, the current frame is provided to a first low pass filter. The first low pass filter may be a temporal low pass filter. The low-pass filter may receive one or more portions of the image frame and reduce values associated with portions of the image frame that are higher than a threshold value (e.g., allowing low frequency data to pass through and removing the high frequency data). The actual amount of reduction can vary depending on a specific low pass filter design. In some embodiments, block 420 can begin a process to detect motion in the input frame and/or input video stream. The motion detection portion can begin by providing the current frame to a low pass filter to remove spatial noise from the video.

At block 425, the current frame is matched with motion detection. For example, after the current frame is provided to the first low pass filter, at least a portion of the current frame that includes motion can be detected. The motion in a frame can be detected in many ways, including motion within one or more frames or motion between a plurality of frames. The motion detection can use a motion detection algorithm, including the motion detection algorithm found in the standard codecs, which can output a mask frame (e.g., block 430). In an embodiment, the output from the motion detection can be pixel-based.

The frame averaging module may implement a recursive algorithm to determine which frame averaging technique is chosen. The recursion may be performed to modify the frame averaging. A different frame integration technique may be selected based on the amount of motion received or based on the motion detected in the frame. In an embodiment, if there is a combination of motion and no motion, the frame averaging module could take some combination of the two and select an appropriate frame averaging technique, adaptive to the motion.

For example, the frame averaging module may be compared to a sport mode on a digital camera. For a sport mode on a digital camera, a user may select the mode through the camera's options and the camera can determine what ISO to apply to the images. The user can take images using the camera's selected ISO. Here, the frame averaging module can review the plurality of images (e.g., input frames) provided by the user, determine how much motion is present in the frame, and chose a mode based on the motion present in the images (e.g., sport mode, night mode, portrait mode, etc.). The output frame may be provided to the user after frame averaging and/or motion detection.

In an embodiment, the output of the motion detection algorithm is a table of rational numbers, where 1 signifies motion and 0 signifies no motion. A threshold may be compared to a sum of the table of rational numbers. When the sum of the table is below the threshold, a traditional frame averaging algorithm may be applied to the pixels in the frame. When the sum is above the threshold, an alpha blended frame integration technique can be applied to the pixels in the frame. In an embodiment, a second algorithm can be applied to determine and optimize the amount of motion is produced in the resultant frame(s).

In an embodiment, the motion detection portion can be repeated to allow different methods of motion detection methods to be performed on the current frame. For example, standard codecs (e.g., lossy compression, motion joint photographic experts group (JPG), MP4, etc.) may have motion detection algorithms associated with their specific file types. Accordingly, these standard codecs can output metrics or vectors that are associated with the motion between frames.

In an embodiment, an absolute difference algorithm can be used. For example, when two frames are compared and motion is detected, any parts of the image that have not moved can remain unchanged. The associated mask frame (e.g., block 430) can be black. Motion could be depicted as a difference signal that can have some value greater than 0 (e.g., black).

Frames in the motion detection module may be stored in frame memory. In an embodiment, frame memory may be illustrated as a table of cells, where each cell in the table represents a separate pixel in the frame. This can be considered as storing the image data (i.e., pixel intensity) in the frame memory. Additionally, the frame memory may store an array that includes a rational number between 0.0 and 1.0 that indicates the motion present in each pixel.

At block 430, a mask frame is generated. For example, the output of the motion detection module can be a definition of the pixels in the image frame. The image frame may be 180×240 and pixel at location [1, 1], or the top-left corner of the frame, may be associated with a certain amount of motion for that pixel. The mask frame can help identify which portion of the current frame that is used to generate the output frame (e.g., based on which portion of the current frame includes the motion detection).

The mask frame can be represented in terms of black and white (e.g., a grayscale image including black pixels and white pixels). Black may represent no motion and the current frame can be added verbatim. White may represent motion and the system may use a frame integration technique to process the pixels affected by the motion. Gray may represent some amount of motion in between no motion and a lot of motion.

The mask frame may be represented as a rational number (e.g., a matrix of coefficients where the pixels correspond with a value of motion). For example, the rational numbers may be stored in a 180×240 table. For example, a pixel at location [1, 1], or the top-left corner of the frame, may experience significant motion, and a value of 1.0 may be stored at that location. In an embodiment, when significant motion is detected, either a frame averaging algorithm or a copy of the most recent frame can be applied to the mask frame.

For example, each pixel may be represented in a rational number between 0.0 and 1.0. A number of 1.0 can indicate high motion and no frame integration may be applied for that pixel. A value of 0.0 can indicate no motion and frame integration may occur. In an embodiment, a number produced from the low pass filter can be used to pick which frame integration technique to use. In an embodiment, an operation may be run on the low pass filter to pick a particular frame integration technique.

At block 435, the mask frame is provided to the second low pass filter. The second low pass filter may be a spatial low pass filter.

At block 440, a matrix of pixel values is generated. The matrix of pixel values can include one or more coefficients that are used to determine whether to output a frame averaged pixel or a non-frame averaged pixel. In some embodiments, the matrix of pixel values can be associated with the motion in one or more pixels in the current frame. The matrix of pixel values can also identify the amount of motion in the image frame, instead of only the amount of motion in a pixel. In some examples, the matrix of pixel values can identify one or more pixels over time, so that the matrix of pixel values identifies the particular pixel over a series of input frames.

The matrix of pixel values can be provided to block 410 to generate a combination of the motion and no motion values at a pixel-by-pixel basis. For example, the coefficient can represent the percentage of the input frame that the output frame will include. The result of the mask frame calculations (e.g., stored in the matrix of pixel values) may be 1, which is multiplied at block 410, in order to use 100% of the image frame. For example, the matrix of pixel values can be provided to the first multiplier at block 410 along with the input frame including the current frame.

At block 445, an inverting module is provided. For example, the matrix of pixel values can be provided to the inverting module, where the inverting module inverts the polarity of the matrix of pixel values. The mask frame can be subtracted from 1.0.

At block 450, a second multiplier is provided. The averaged current frame is provided to the second multiplier and the second multiplier identifies whether a portion of the current frame uses output from the frame averaging module or the input frame including the current frame (e.g., without amending the information received with the current frame). As illustrated in the previous example, the inverse of 1 is identified in block 445 (e.g., 0), so that 0% of the frame average (e.g., block 415) is used at block 450.

At block 455, a summing module is provided. As illustrated, 0% of the frame averaging (e.g., block 415) and 100% of the current pixel (e.g., block 410) are combined at the summing module. The output of the first multiplier 410 and second multiplier 450 may be combined in the summing module so that the current frame, the averaged current frame, or some combination of the two can be utilized as the output frame.

In an embodiment, the summing module can be a blending module. The blending module can combine the current frame and the averaged current frame. In an embodiment, the blending module can blend a coefficient associated with the frames. The averaged current frame can be the frame average of two different frames based off of the motion determined between the two frames.

At block 460, output may be provided. The output may be a plurality of image frames that contain less noise than the plurality of image frames that was received as input. In some examples, the input and output includes only the current frame and the process is implemented for each frame in a plurality of frames.

In an illustrative example, when there is no motion, the rational value associated with no motion may be subtracted from 1.0 to create a value at the inverting module. A value can be provided to the first multiplier 410. If a no motion frame is provided to the second multiplier 450, the result can be 0.0. Thus, at the summing module 455, the value would be added to 0.0, resulting in the original value as the output frame 460.

Figure 5:
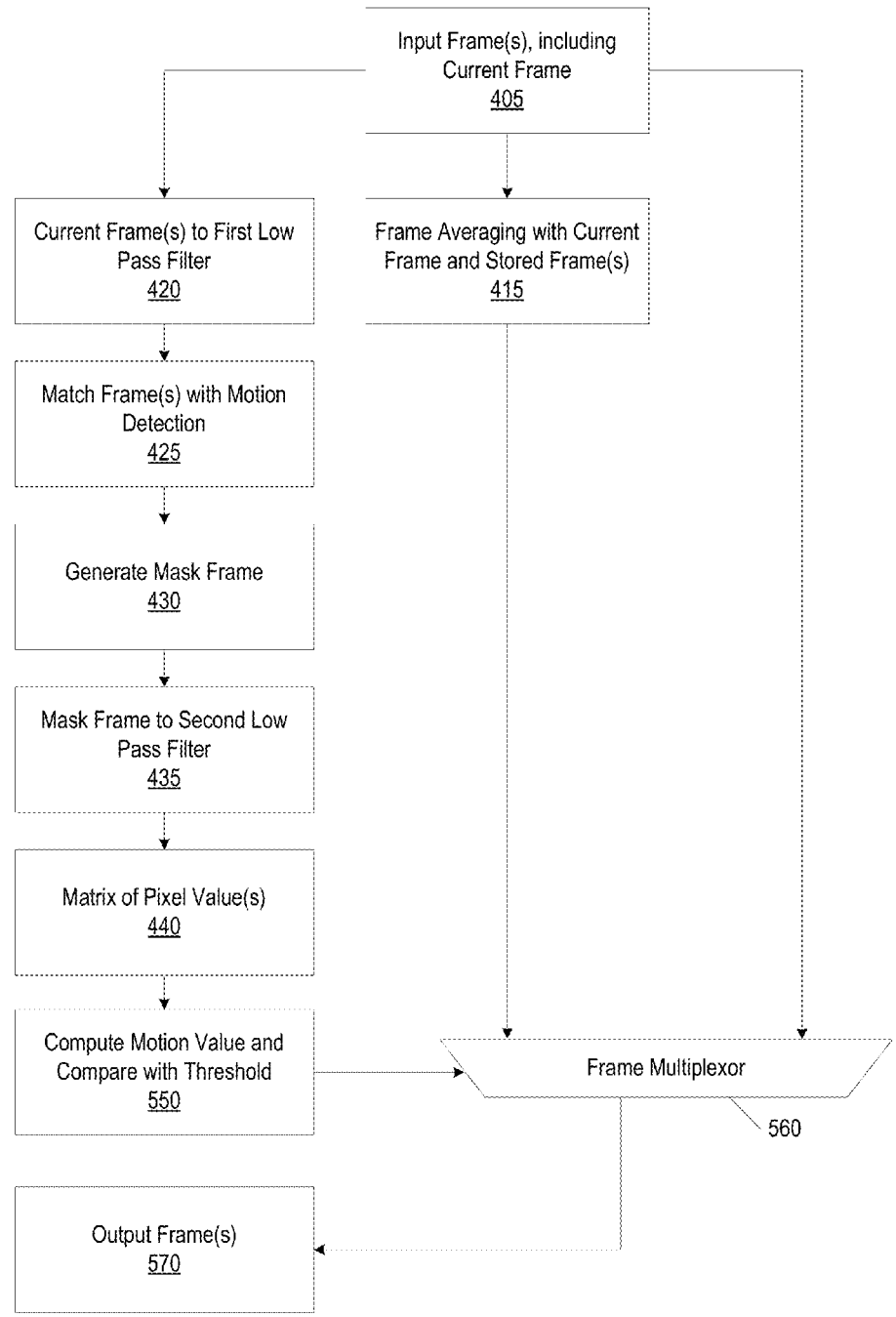
FIG. 5 is a high level schematic diagram illustrating a system for processing images using a threshold according to an embodiment of the present invention.

FIG. 5 is a high level schematic diagram illustrating a system for processing images using a threshold according to an embodiment of the present invention. FIG. 5 may include several similar processes as illustrated in FIG. 4, including receiving an input frame including a current frame (block 405), providing the frame to a frame averaging module (block 415), providing the frame to a first low pass filter (block 420), matching the current frame with motion detection (block 425), generating a mask frame (block 430), providing the mask frame to the second low pass filter (block 435), and generating a matrix of pixel values (block 440). The process may also provide an output frame.

In comparison, FIG. 4 and FIG. 5 may also be distinguishable in several ways. For example, FIG. 4 may review the information in the image frame on a pixel-by-pixel basis (e.g., selecting a particular pixel from a current frame because there is no/little motion vs. selecting a particular pixel from an averaged current frame). FIG. 5 may review the information in the image frame as a whole. As illustrated in FIG. 5, a motion metric can identify the motion detection for the image frame, which includes aggregated pixels comprising the image frame.

At block 550, a motion value can be computed and compared with a threshold. The motion value may identify the amount of motion in one or more portions of the image frame. For example, the matrix of pixel values can be used as one or more motion values that are compared with the threshold. In an embodiment, the motion value is a table of rational numbers, where 1 signifies motion and 0 signifies no motion. A threshold may be compared to a sum of the table of rational numbers (e.g., motion value). When the sum of the table is below the threshold, a traditional frame averaging algorithm may be applied to the pixels in the frame. When the sum is above the threshold, an alpha blended frame integration technique can be applied to the frame.

In another example, the motion value may be summed total of the value in the matrix of pixel values. For example, the matrix of pixel values may be 0.7, 0.5, and 0.3, which identify that 70% of the portion of the image frame includes motion, 50% of the portion of the image frame includes motion, and 30% of the portion of the image frame includes motion. Summing the three values is 1.5 or an average of 50% across the portions of the frames. When the threshold is 70%, the motion value may not exceed the threshold (e.g., little or no motion). When the threshold is 30%, the motion value may exceed the threshold (e.g., a lot of motion).

At block 560, a current frame or averaged current frame can be identified by a frame multiplexor. The identification can be based in part on the comparison of the value with the threshold. As illustrated, when the motion value does not exceed a threshold (e.g., little or no motion), the averaged current frame may be identified by the frame multiplexor. When the motion value exceeds a threshold (e.g., a lot of motion), the output frame may be the original input frame (e.g., the current frame).

At block 570, output may be provided (e.g., output frame, output video stream, etc.). The output may be a plurality of image frames that contain less noise than the plurality of image frames that was received as input. In some examples, the input and output includes only the current frame and the process is implemented for each frame in a plurality of frames.

Figure 6:
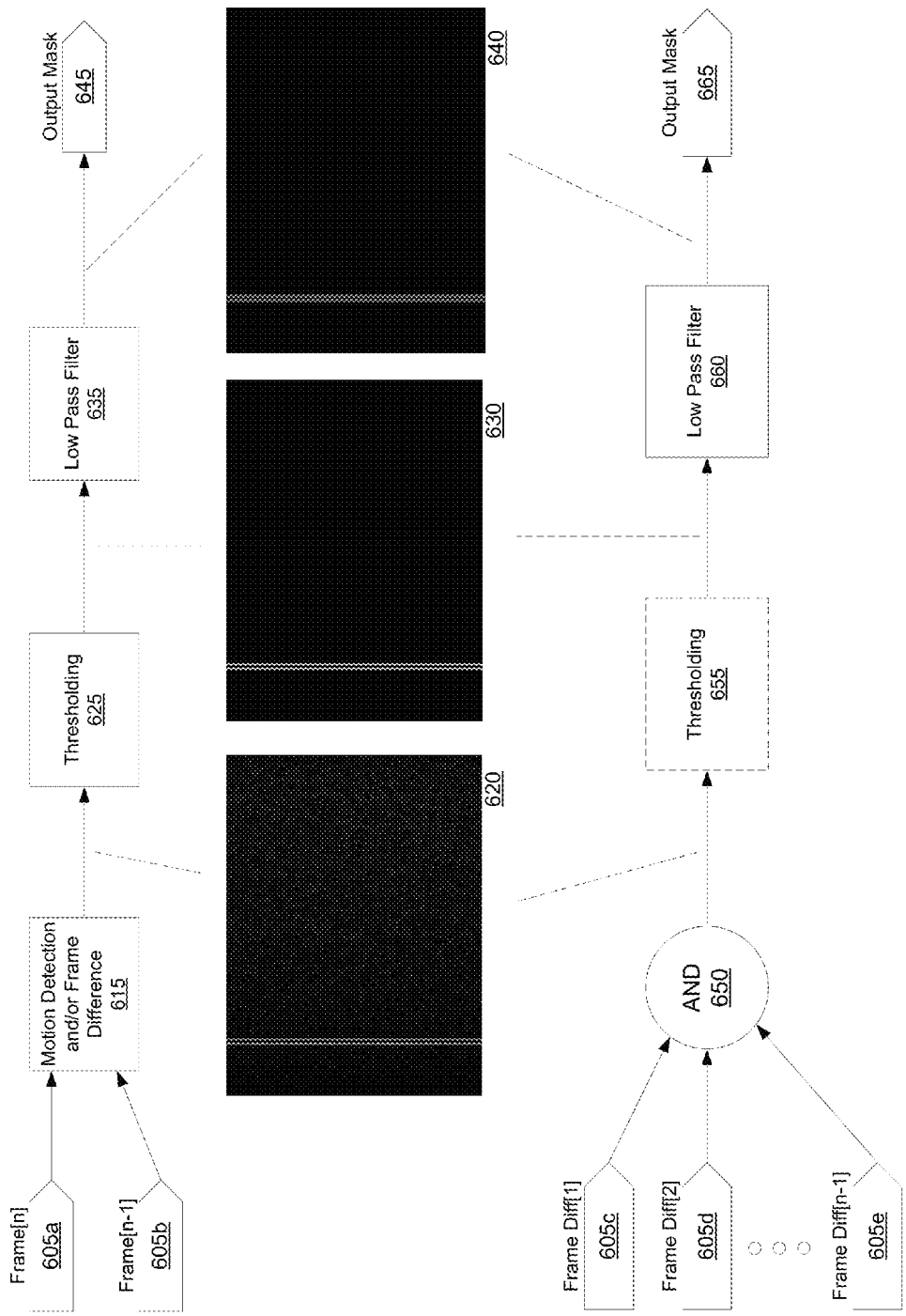
FIG. 6 is a high level schematic diagram illustrating a system for generating an output with detecting motion between two or more frames according to an embodiment of the invention.

FIG. 6 is a high level schematic diagram illustrating a system for generating an output with detecting motion between two or more frames according to an embodiment of the invention. As illustrated in FIG. 6, a plurality of image frames 605 are received, including 605a, 605b, 605c, 605d, and 605e. For example, two image frames can be received frame[n] and frame[n−1], as illustrated with 605a and 605b, respectively. In another example, more than two image frames can be received (e.g., "n" total frames) and identified as frame diff[1], frame diff[2], and frame diff[n−1], as illustrated with 605c, 605d, and 605e, respectively.

The image frames illustrated in FIG. 6 can represent the current frame at different time intervals or steps of a method. For example, current frame 620 illustrates the current frame with noise, current frame 630 illustrates the current frame using only black and white (e.g., removing any gray), and current frame 640 illustrates the current frame with the noise removed (e.g., after the frame averaging, multiplication, summing, etc.). The image data associated with the current frame may be processed through various methods, including the methods described herein.

The current frame 630 can also illustrate an image frame where the pixel values below a particular threshold are adjusted to a different pixel value. For example, the threshold may be 0.50 pixel value or coefficient. When a pixel value is 0.25, the pixel value may be adjusted to 0.50 (the threshold value) or 0.0 (a constant value). When the pixel value is 0.7, the pixel value may be adjusted to 0.50 (the threshold value) or 1.0 (a constant value). In some embodiments, the thresholding at block 625 or block 655 can implement the adjustments to the pixel values.

In some embodiments, image frames 605a and 605b are provided to a frame difference module 615 so that the difference between image frames 605a and 605b is determined (e.g., the noise image frame). The frame difference may be similar to matching the frames with motion detection, as illustrated with block 425. In some embodiments, an absolute frame difference is determined. The noise in the image may be highlighted, as shown in the illustration of the current frame 620. The output from the frame difference 615 may be represented as rational numbers, as described herein.

At block 625, thresholding can be performed. Thresholding may remove at least part of the noise in the current frame to produce a black and white image. The thresholding can remove some of the high frequency noise. For example, one or more pixels and/or rational number below a certain value can be turned to zero (e.g., maintained in its original state) and pixels and/or rational numbers above a certain value can be turned to black (e.g., applied to a frame averaging technique). The black and white image may be a flat field.

At block 635, a low pass filter is applied to the black and white image to form a gray image. The gray image can show a smooth transition for areas of motion and non-motion. This may be advantageous because the user may be less likely to notice the gray transition of the image, than the blurred or noise-filled images.

At block 645, an output mask is generated. Black portions of the mask can reflect areas of no motion and can result in pure frame averaging ([Frame1+Frame2]/2). White areas can indicate a moving edge and can result in no frame averaging. Gray areas represent a transition zone and will incorporate elements of no frame averaging as well as frame averaging. In some embodiments, the output mask may be applied to the current frame to generate an output frame.

Other methods of generating an output mask are also possible. For example, image frames 605*c*, 605*d*, and 605*e* are provided to a summing module 650. The image frames may include two or more image frames (e.g., at least three image frames including the current frame). In some examples, the image frames 605*c*, 605*d*, and 605*e* are frame differences and are logically ANDed through a logical AND module.

In another example, eight frames may be integrated, which can utilize seven frame differences to generate an output mask. The seven frame differences could generate the output mask with respect to each other. In an embodiment of the invention, the seven frame differences could generate the output mask with respect to a referenced base frame (e.g., frame 8). The result of the summing module is illustrated by current frame 620.

At block 655, optional thresholding is determined. In some examples, the thresholding is provided before the image frames 605*c*, 605*d*, and 605*e* are provided to a summing module 650. The frames may be a binary representation of the motion measured in the frame. In an embodiment, a threshold can be used to change the number of frames being averaged.

At block 660, the result is provided to a low pass filter.

At block 665, an output mask is generated. The output mask can be a pixel-based representation of 0.0 to 1.0 numbers representing the motion in a pixel. The output mask can be used to select the different integration algorithms. The output mask can be incorporated with the output of the mask low pass filter or the mask frame.

Figure 7:
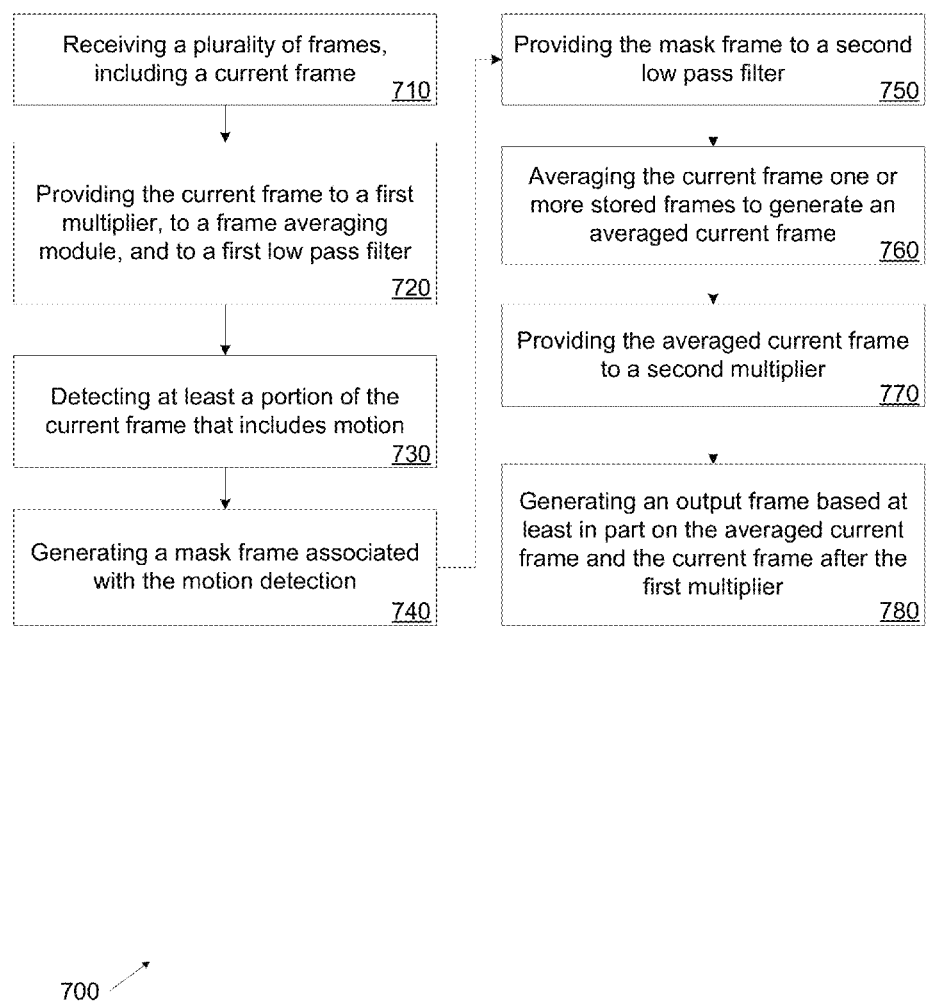
FIG. 7 is a high level flowchart illustrating a method of implementing a noise reduction technique according to an embodiment of the present invention.

FIG. 7 is a high level flowchart illustrating a method of implementing a noise reduction technique according to an embodiment of the present invention. For example, the method can select a frame averaging technique based on the motion detected in more than one image frame.

At block 710, a plurality of frames is received. The plurality of frames can include a current frame. The current frame may include an input video stream, one or more image frames, or image data (e.g., width, height, 3-dimensional frame rate, real-time video rate, high frame rate). In some embodiments, the input frame including the current frame is received from an infrared (IR) sensor. For example, the IR sensor can measure IR light (e.g., heat, energy, etc.) radiating from objects in its field of view.

At block 720, the current frame is provided to a first multiplier, to a frame averaging module, and to a first low pass filter. The current frame may be provided in parallel to a first multiplier, to a frame averaging module, and to a first low pass filter, which can increase the efficiency of processing the current frame.

At block 730, at least a portion of the current frame that includes motion is detected. In some examples, the motion detection is implemented after the current frame is provided to a first low pass filter. The motion in a frame can be detected in many ways, including motion within one or more frames or motion between a plurality of frames. The motion detection can use a motion detection algorithm, including the motion detection algorithm found in the standard codecs. In an embodiment, the motion detection can be pixel-based or repeated to allow different methods of motion detection methods to be performed on the current frame.

At block 740, a mask frame associated with the portion of the current frame that includes the motion detection is generated. For example, the output of the motion detection can be a definition of the pixels in the frame. The frame may be 180×240 and pixel at location [1, 1], or the top-left corner of the frame, may be associated with a certain amount of motion. The mask frame can help identify which portion of the current frame that is used to generate the output frame (e.g., based on which portion of the current frame includes the motion detection). The mask frame may be represented in terms of black and white or as a rational number.

At block 750, the mask frame is provided to a second low pass filter. The second low pass filter may be a spatial low pass filter.

At block 760, the current frame and one or more stored frames are averaged to generate an averaged current frame. For example, the averaging is implemented after the current frame is provided to the frame averaging module. For example, a temporal average can be applied to the current frame and one or more stored frames (e.g., "n" frames). Other frame averaging techniques may be implemented, including an addition technique (e.g., one or more pixel values in two frames are added and divided by two), an infinite impulse response (IIR) filter, alpha blend (e.g., the current frame and the previous frame carry more weight than other frames), or other frame integration techniques known in the industry.

At block 770, the averaged current frame is provided to a second multiplier. In some examples, the second multiplier identifies whether a portion of the current frame uses output from the frame averaging module or the input frame including the current frame (e.g., without amending or partially amending the information received with the current frame).

At block 780, an output frame is generated based at least in part on the averaged current frame and the current frame after the first multiplier. The output frame may contain less noise than the image frame received as input, but still maintain the motion detected with the input frame. In some examples, the input and output includes only the current frame and the process is implemented for each frame in a plurality of frames.

It should be appreciated that the specific steps illustrated in FIG. 7 provide a particular method of adjusting information in an image frame. Other sequences of steps may also be performed according to alternative embodiments. For example, alternative embodiments of the present invention may perform the steps outlined above in a different order.

Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
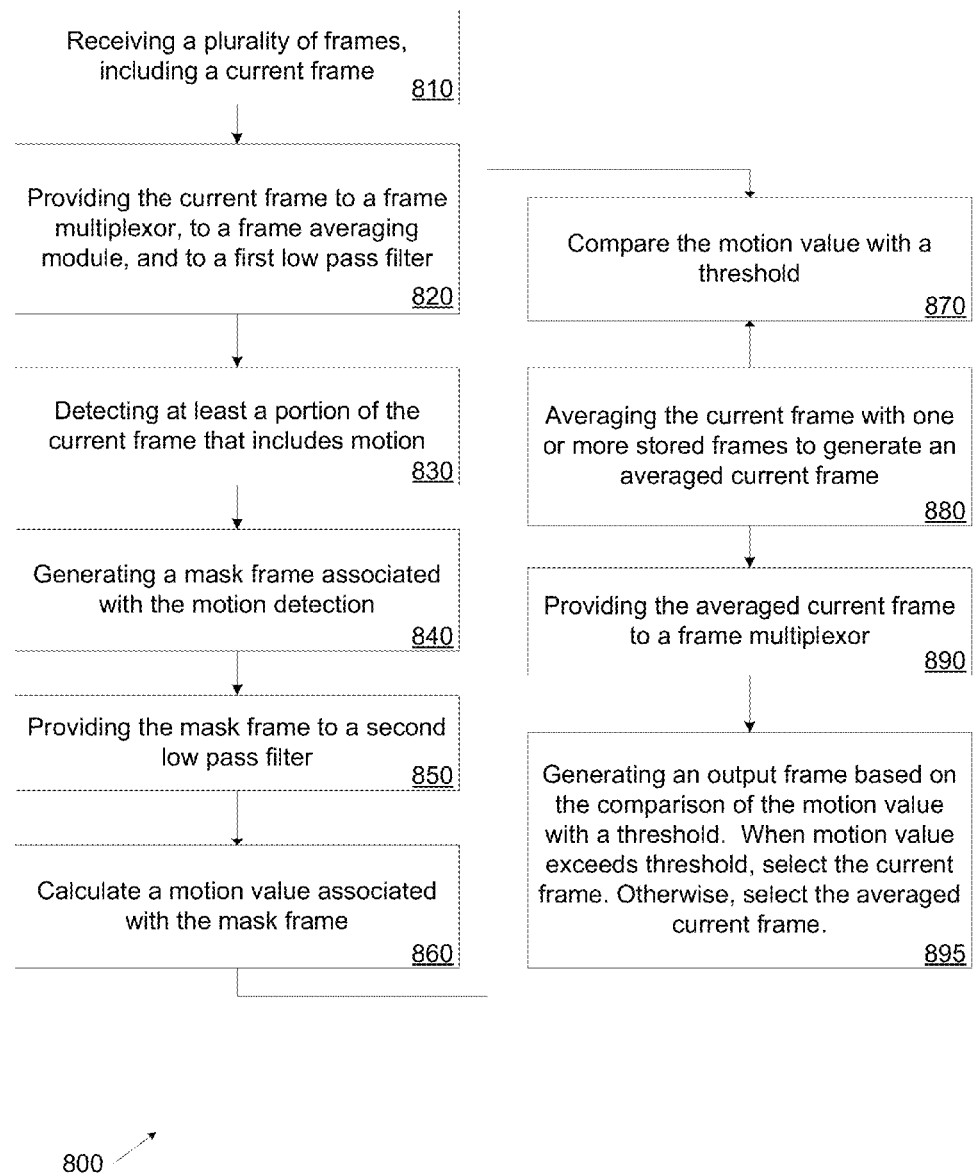
FIG. 8 is a high level flowchart illustrating a method of implementing a noise reduction technique according to an embodiment of the present invention.

FIG. 8 is a high level flowchart illustrating a method of implementing a noise reduction technique according to an embodiment of the present invention. For example, the method can reduce noise in an image frame using one or more methods of processing data for the image frame. As illustrated in FIG. 8, the method 800 begins at block 810 by receiving a plurality of frames.

At block 820, the current frame is provided to a frame multiplexor, to a frame averaging module, and to a low pass filter.

At block 830, at least a portion of the current frame that includes motion is detected.

At block 840, a mask frame associated with the motion detection is generated.

At block 850, the mask frame is provided to the second low pass filter.

At block 860, a motion value is calculated based off of the mask frame (e.g., after mask frame is provided to the second low pass filter).

At block 870, the motion value is compared with a threshold.

At block 880, the current frame is averaged with one or more stored frames to generate an averaged current frame.

At block 890, the averaged current frame is provided to a frame multiplexor.

At block 895, the output frame is generated based on the comparison of the motion value with a threshold. When motion value exceeds threshold the current frame is selected. Otherwise, the averaged current frame is selected.

It should be appreciated that the specific steps illustrated in FIG. 8 provide a particular method of reducing noise in a digital frame according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, the method may include comparing a value for each pixel with a threshold to determine an averaging technique. For example, the method may include receiving a plurality of frames, calculating the coefficient associated with each frame to generate a plurality of coefficients, summing the plurality of coefficients to generate a value for each pixel, comparing the pixel value with a threshold to generate a comparison value, and determining an averaging technique based on the comparison value.

The coefficient may be a value between 0 and 1. When the value is below the threshold, a traditional frame integration technique may be applied. When the value is above the threshold, an alpha blend may be applied. In some embodiments, the plurality of frames can comprise one or more regions of interest. The one or more regions of interest can include a plurality of high motion pixels. A priority may be assigned to the region of interest, such that when the priority is low, the region of interest is low. The averaging technique may be chosen that allows each pixel in the region of interest to blur.

It should be appreciated that the specific steps illustrated in this method provide a particular method of reducing noise in a digital frame. Other sequences of steps may also be performed according to alternative embodiments. For example, alternative embodiments may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

III. Adaptive Pixel Replacement

Embodiments of the system also relate generally to methods and systems for adaptively replacing pixels in data maps by identifying one or more pixel replacement techniques to generate an adaptive pixel replacement mask. In an embodiment, multiple pixel replacement techniques can be analyzed during calibration or run time to form an adaptive pixel replacement technique for one or more of the pixels in the image frame and/or input video stream.

One or more pixel replacement techniques may be identified and assigned to pixels simultaneously or concurrently in a system. During the analysis, a data map may be analyzed to determine the appropriate pixel replacement technique for each pixel. The analysis can be done once when the pixels are first created and mapped to a sensor, each time during the data taking process, or multiple times throughout the life of the pixels. The bad pixels can be associated with a mask so that each position of the mask relates to the information gathered by each pixel. When the bad pixel map is implemented in real-time, the chosen pixel replacement techniques can be provided for known bad pixels, and newly discovered bad pixels can be analyzed, assigned to a pixel replacement technique, and the pixel value associated with the bad pixel can be adjusted using the chosen pixel replacement technique.

Embodiments of the invention can analyze a variety of pixel replacement techniques to determine which pixel technique is optimal for a particular situation. For example, some of the bad pixel replacement techniques can include left good pixel, right good pixel, local average, spiral search, upper replacement, lower replacement, or the like. Other pixel replacement techniques may be utilized as well. Embodiments of the present invention may use these or other techniques to define locations of bad pixels and influence which technique to use. Embodiments of the invention can analyze various sensor wavelengths (e.g., visible, infrared) and pixel sampling techniques (e.g., orthogonal, diagonal, bayer filter, pentile, etc.).

According to some embodiments, the term "bad pixel" can be understood to include a single pixel in an image frame that fails to show the image at a particular location. Instead, the bad pixel may show black, white, or zero when represented as a rational number. The bad pixels may be found when a camera is manufactured and comes off the manufacturing line with one or more bad pixels. Accordingly, the term "good pixel" can be understood to include a single pixel in an image frame that shows the image received at that location.

In an illustrative example, a thermal infrared image frame is received and a data map is obtained based on the image frame. The data map includes good pixels and bad pixels at a various locations, based on a binary determination (e.g., good or not good, white or black, one or zero, etc.). The pixels can also include a certain number of bits of data that define the number of photons in the thermal infrared image (e.g., 0 to 256 shades of gray, 0 to $2^{16}$ shades of gray, etc.). With a bad pixel, the corresponding intensity (e.g., brightness, darkness, etc.) of the image identified by the bits of data in the output can be higher or lower than the image received as input. In some embodiments, the system can adjust the pixel value associated with the bad pixel to make the bad pixel less noticeable in the output, using one or more pixel replacement techniques. A particular pixel replacement technique can be identified for the particular bad pixel based on a variety of factors, including the placement of the bad pixel on in the image frame, the concentration of the bad pixel in relation to other bad pixels, and the like.

According to some embodiments, the term "technique" can be understood to include an algorithm stored as code in memory, or a process of assigning a new value to a bad pixel. The technique can be implemented using a system or human. In an embodiment, the technique can analyze the layout of the bad pixels, determine how the bad pixels are arranged (e.g., proximity to each other, proximity to an edge), and select how to make the bad pixel less noticeable in an output image (e.g., output video stream).

According to some embodiments, the term "kernel" can be understood to include a portion of a frame, so that if a frame of a video image is 180-by-240 (e.g., 180×240), a kernel can be something smaller than the frame. For example, the kernel may be a 3-by-3 block of pixels. The kernel can also be larger, like 5-by-5, 7-by-7, or 9-by-9, and reduced to a smaller kernel size.

Figure 9:
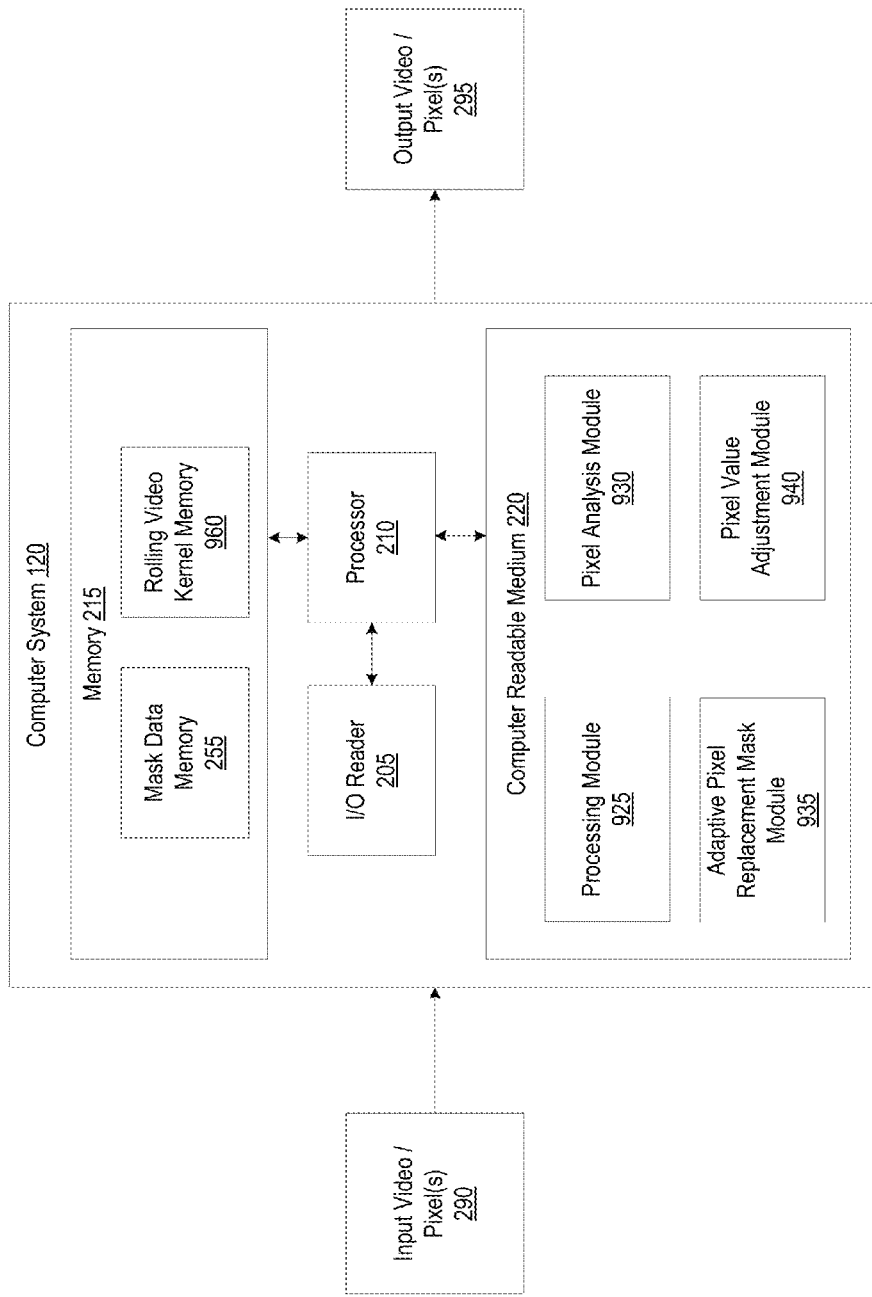
FIG. 9 is a high level schematic diagram illustrating a system for processing images according to an embodiment of the present invention.

FIG. 9 is a high level schematic diagram illustrating a system for processing images according to an embodiment of the present invention. As illustrated in FIG. 9, a computer system 120 may comprise an I/O (input/output) reader 205, processor 210, memory 215, and computer readable medium 220. The memory 215 can comprise multiple portions of memory, including a mask data memory 255 and rolling video kernel memory 960. The computer readable medium 220 can comprise multiple modules, including a processing module 925, pixel analysis module 930, adaptive pixel replacement mask module 935, and pixel value adjustment module 940.

A processing module 925 may be implemented. The processing module can receive or generate a data map. For example, the processing module can receive a data map that identifies the good pixels and bad pixels (e.g., pixel [1, 1] is good and pixel [1, 2] is bad). In another example, the processing module can generate the data map. In yet another example, the processing module can generate a data map that includes a default selection of bad pixels (e.g., based on previously identified bad pixels) and update the pixels when the image value for the pixel based on information received from other modules in the system (e.g, pixel analysis module).

A pixel analysis module 930 may be implemented. The pixel analysis module 930 can analyze the locations of bad pixels and their surrounding pixels in the kernel for the image frame. This analysis can make decisions about which pixel replacement technique provides the best image quality result. The pixel analysis module 930 can then alter a mask code for each pixel to the specific code used to select the pixel replacement technique. In an embodiment, the pixel analysis module 930 can be used when no pre-analysis of the bad pixel mask has been performed. In an embodiment, the pixel analysis module can be implemented real-time.

An adaptive pixel replacement mask module 935 may be implemented. The adaptive pixel replacement mask module 935 can evaluate the code stored for each pixel (e.g., 1 is left good pixel, 3 is local pixel average, etc.) and select the corresponding pixel replacement technique to generate the adaptive pixel replacement mask.

An adaptive pixel replacement module 940 may be implemented. The pixel value adjustment module 940 can adjust the pixel value associated with the bad pixel using the pixel replacement technique identified by the adaptive pixel replacement mask.

The mask data memory 255 includes pixels and corresponding pixel replacement techniques (e.g., identified by a code). In some examples, the mask data memory 255 provides the pixel and pixel replacement technique to the adaptive pixel replacement mask module 935 for evaluation and determination of which pixel replacement technique to use for a particular pixel.

The rolling video kernel memory 960 includes one or more frames in a video stream. In some examples, the rolling video kernel memory 960 provides the image frame to an adaptive pixel replacement mask. The pixel values associated with the bad pixels in the provided image frame are adjusted to correspond with different values. The image frame with the adjusted bad pixel values are provided as output.

Figure 10:
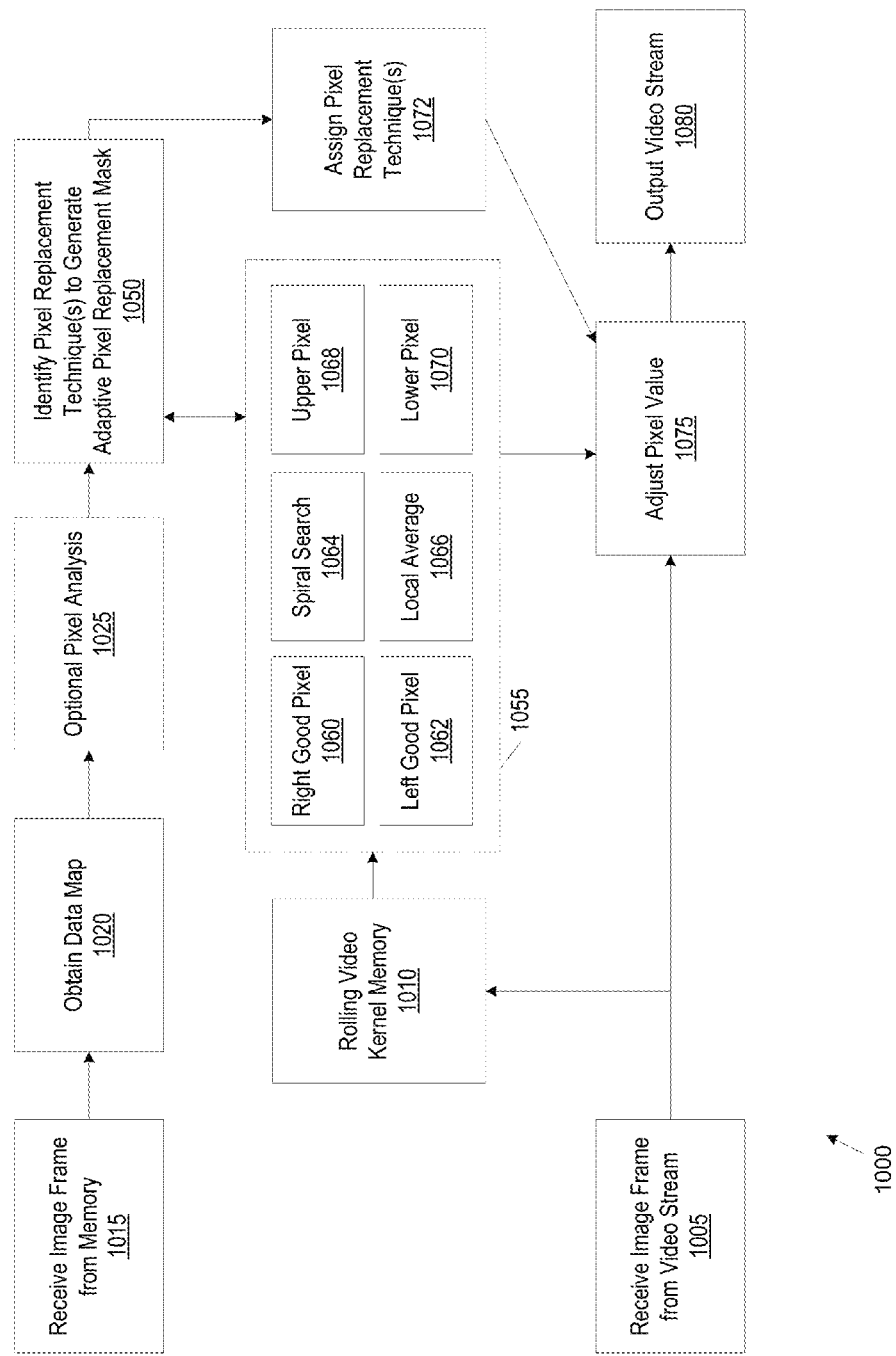
FIG. 10 is a high level schematic diagram illustrating an adaptive pixel replacement technique according to an embodiment of the present invention.

FIG. 10 is a high level schematic diagram illustrating an adaptive pixel replacement technique according to an embodiment of the present invention. The illustration 1000 includes block 1005, when an image frame is received from the video stream.

At block 1010, the image frame is stored in the rolling video kernel memory. The image frame is provided to various pixel replacement techniques 1055. In some examples, the image frame is provided from block 1010 with the image frame provided from block 1050, as identified below.

At block 1015, the image frame is received from memory. In some examples, the image frame is received that includes the data map. The image frame can include pixel values for one or more image frames and/or a video stream of image frames, where the image frames are selected from the video stream and stored in memory.

At block 1020, a data map is obtained. The data map can comprise information for one or more pixels in an image frame. For example, the data map can comprise good pixels at a first set of locations associated with the data map and bad pixels at a second set of locations associated with the data map. In some examples, a data map is adaptively determined (e.g., in real time, concurrently with receipt of the image frame, etc.).

The data map can identify that the current pixel is a bad pixel and identify that one or more other pixels around the current pixel are also bad pixels. In another example, the pixel analysis can update the data map with information regarding whether the pixels are good pixels or bad pixels. The optional pixel analysis can adaptively replace pixels in the data map by identifying one or more pixel replacement techniques to generate an adaptive pixel replacement mask. In an embodiment, multiple pixel replacement techniques can be analyzed during calibration or run time to form an adaptive pixel replacement technique.

At block 1025, an optional pixel analysis is conducted. For example, the user can identify one or more bad pixels to associate with the data map, including pixel [1, 1] even though pixel [1, 1] is not identified as a bad pixel in the data map (e.g., received with the image frame from memory or the video stream). The additional pixel analysis may be based on manual analysis of the pixel map by the user, a secondary pixel analysis of the image frame (e.g., through a local computing device), or other methods. The data map may be updated using the optional pixel analysis.

At block 1050, one or more pixel replacement technique(s) are identified to generate an adaptive pixel replacement mask. In some examples, the pixel replacement technique is determined for each pixel dynamically (e.g., in order to obtain a realistic pixel value for the particular pixel).

One or more bad pixels identified in the data map can be associated with a pixel replacement technique at block 1055. At block 1055, various pixel replacement techniques are considered, including spiral search, local average, right good pixel, left good pixel, upper replacement, lower replacement, or any pixel replacement techniques known in the art.

At block 1060, a right good pixel includes adjusting the pixel value of the current pixel to the pixel value of the first good pixel to the right of the current pixel. Similarly, at block 1062, left good pixel includes adjusting the pixel value of the current pixel to the pixel value of the first good pixel to the left of the current pixel. Additional details and features of left good pixel are illustrated with FIG. 12A.

At block 1064, a spiral search includes adjusting the pixel value of the current pixel to one of the pixels next to the current pixel. For example, the spiral search may identify a bad pixel and analyze the pixel to the left of the current pixel to determine whether that pixel is a good pixel. If not, the spiral search can analyze the pixel above the left pixel, then the pixel to the right, then another pixel to the right, then a pixel below, etc. until the spiral search analyzes each of the pixels in a spiral around the current pixel to determine whether any of the pixels next to the current pixel are good pixels. The spiral search can adjust the pixel value of the current pixel to the first good pixel that the spiral search encounters. Additional details and features of a spiral search are illustrated with FIG. 12B.

At block 1066, a local average includes adjusting the pixel value of the current pixel to an average pixel value of the good pixels around the current pixel. Additional details and features of a local average are illustrated with FIG. 12C.

At block 1068, an upper replacement includes adjusting the pixel value of the current pixel to the pixel value of the first good pixel above of the current pixel. Similarly, at block 1070, a lower replacement includes adjusting the pixel value of the current pixel to the pixel value of the first good pixel below of the current pixel.

At block 1072, a pixel replacement technique can be assigned (e.g., by providing a selection bit to identify the assigned pixel replacement technique to an adjustment module). The pixel replacement technique can be identified by a selection bit (e.g., 1, 2, 100, etc.). In an embodiment, each pixel replacement technique is defined by a unique code. Data memory and resources may also be enhanced and allocated for worst case kernel selection. The defect criteria can influence the chosen pixel replacement technique.

At block 1075, the pixel value can be adjusted. For example, the pixel is identified as a good pixel and the value for the pixel is the value associated with the original pixel value received with the image frame (e.g., from memory, pixel [1, 1] uses the pixel value associated with pixel [1, 1] originally). In some examples, the pixel is identified as a bad pixel. The pixel value associated with the bad pixel can be adjusted based on the pixel replacement technique assigned to the bad pixel (e.g., pixel [1, 2] uses the pixel value associated with pixel [2, 2] because a lower replacement pixel replacement technique was assigned).

At block 1080, an output video stream can be provided. The output video stream can include each of the pixels in the input video stream, where one or more pixel values associated with the pixel in the output video stream have been adjusted.

Figure 11:
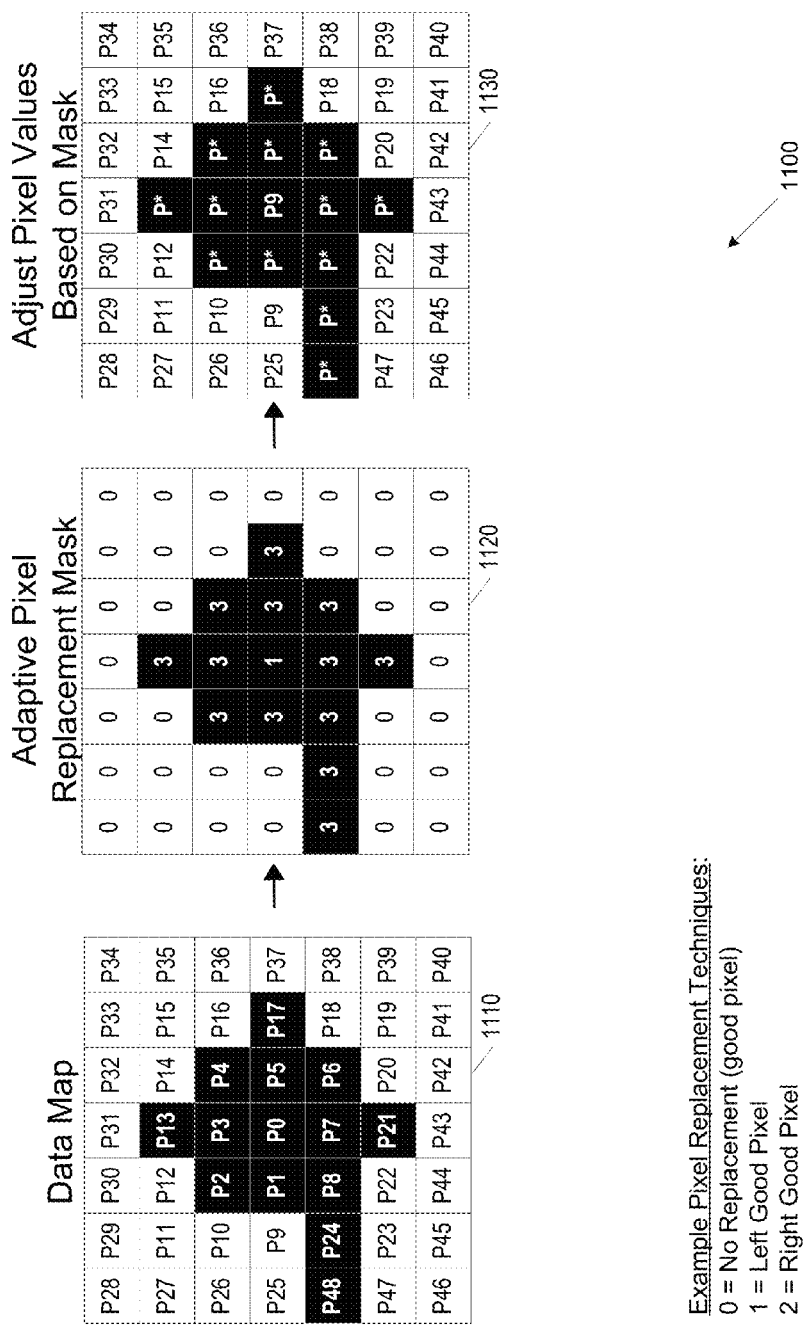

FIGS. 11, 11A, 11B, and 11C are high level schematic diagrams illustrating an adaptive pixel replacement technique for a plurality of pixels according to an embodiment of the present invention. As illustrated in FIG. 11, an adaptive pixel replacement technique can be used on the image frame, so that each pixel can be analyzed for the optimal pixel replacement technique to implement. In an embodiment, the adaptive pixel replacement technique can look to several, simultaneously-enabled pixel replacement techniques to create the mask.

At block 1110, a data map is received. The data map can include several bad pixels, including P0-P8, P13, P17, P21, and P48. In an embodiment, a kernel is also identified. The kernel may include the number of pixels that surround a current pixel. The kernel can be stored in memory with the current pixel to analyze when determining an appropriate pixel replacement technique. When the kernel is large (e.g., 9×9), a smaller kernel can be chosen (e.g., 5×5). This can be advantageous in keeping the amount of memory required to a minimum, especially when the value of each pixel in the kernel is stored in memory for some of the available pixel replacement techniques that the adaptive pixel replacement technique can choose. As illustrated, the pixels shown in the data map can be an image frame and the kernel size can be a 3-by-3 kernel size.

Figure 11A:
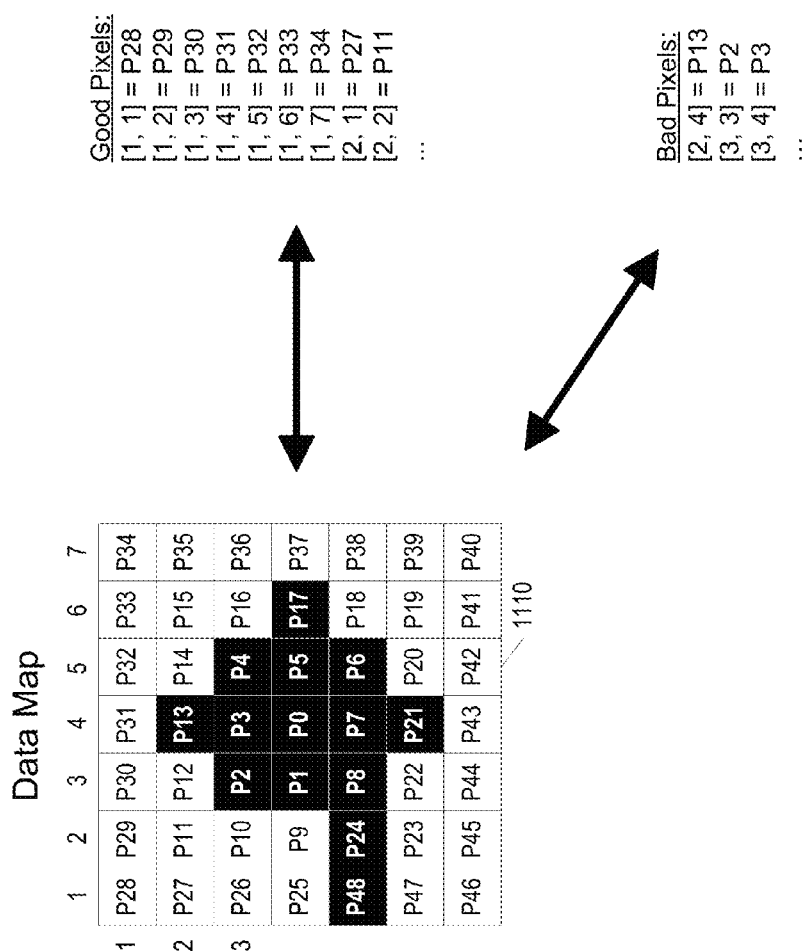

As illustrated in FIG. 11A, the data map includes good and bad pixels. The image frame includes 7×7 pixels or 49 pixels total and the good and bad pixels from the image frame are identified in the data map. The good pixels include [1, 1], [1, 2], [1, 3], [1, 4], [1, 5], [1, 6], [1, 7], [2, 1], and so on. The original pixel value associated with pixel [1, 1] is the pixel value in P28. The original pixel value associated with pixel [1, 2] is the pixel value in P29, etc. The bad pixels include [2, 4], [3, 3], [3, 4], and so on.

Returning to FIG. 11, an adaptive pixel replacement mask is identified at block 1120. The adaptive pixel replacement mask associates one or more pixels with one or more pixel replacement techniques and/or adjusts the pixel value using the corresponding pixel replacement technique.

An adaptive pixel replacement mask can be generated. In this example, the pixel locations can be changed to the pixel replacement method that the adaptive pixel replacement technique chooses to use for the particular pixel. For example, the value 1 can represent left good pixel, 2 can represent right good pixel, 3 can represent local pixel average, and 4 can represent spiral search. In an embodiment, the mask value associated with pixels P1-P8, P13, P17, P21, and P48 have been changed to 3 and the mask value associated with pixel P0 has been changed to 1. In an embodiment, a number other than 0 may trigger the corresponding pixel replacement technique for that pixel.

Figure 11B:
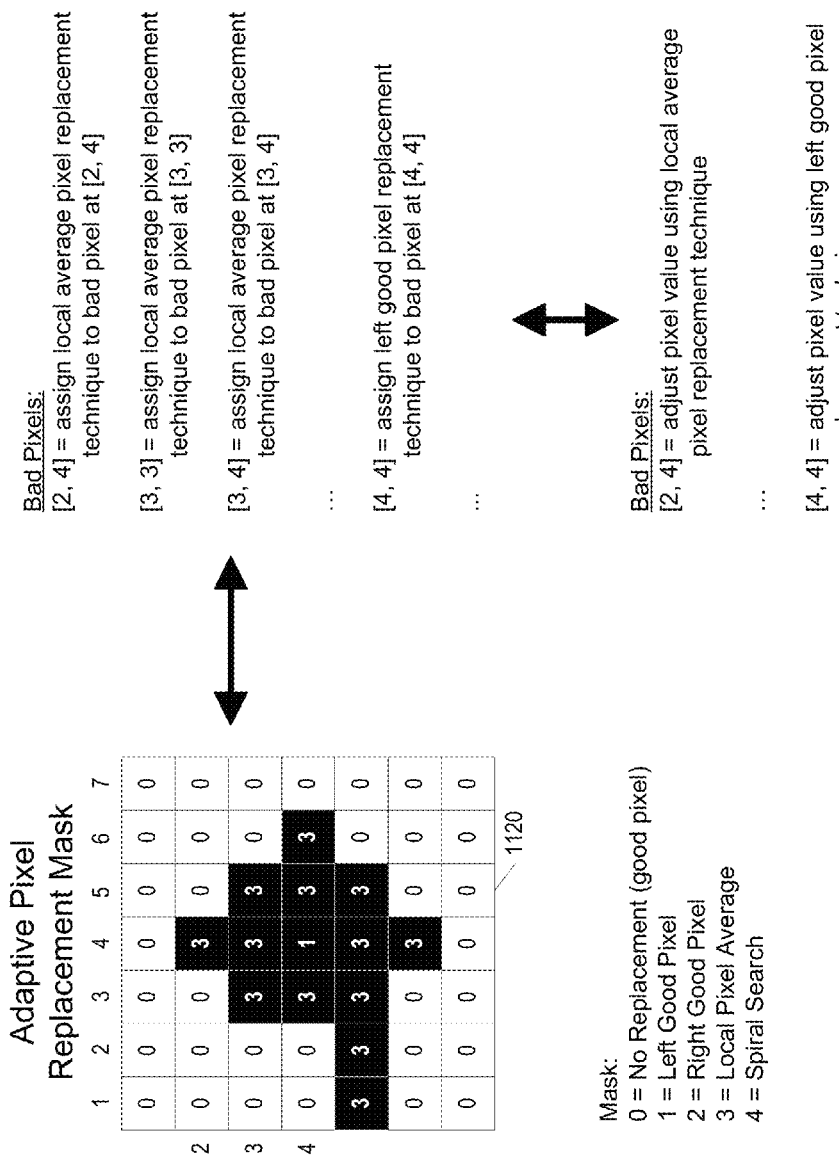

As illustrated in FIG. 11B, other naming conventions may also be used to identify the good or bad pixels. For example, using the same data map, pixel [2, 4] is assigned a local average pixel replacement technique, pixel [3, 3] is assigned a local average pixel replacement technique, pixel [3, 4] is assigned a local average pixel replacement technique, and pixel [4, 4] is assigned a left good pixel replacement technique.

The pixel replacement techniques can be used to adjust a pixel value. For example, bad pixel [2, 4] is assigned the pixel value using local average pixel replacement technique, bad pixel [3, 3] is assigned the pixel value using local average pixel replacement technique, bad pixel [3, 4] is assigned the pixel value using local average pixel replacement technique, and bad pixel [4, 4] is assigned the pixel value using left good pixel replacement technique.

Returning to FIG. 11, the pixel values are adjusted based on the adaptive pixel replacement mask at block 1130. The adaptive pixel replacement mask associates one or more pixels with one or more pixel replacement techniques and/or adjusts the pixel value using the corresponding pixel replacement technique. The output frame can be created from a combination of the data map and adaptive pixel replacement mask. The output frame can be a combination of one or more pixel replacement techniques for the pixels to generate reasonable solutions for bad pixels that could be missed by a single technique approach.

As illustrated in FIG. 11C, one or more of the pixel values are adjusted based on the adaptive pixel replacement mask. In this example, the pixel value for P0 has been adjusted to the pixel value for P9, and the pixel values for P1-P8, P13, P17, P21, and P48 have been averaged with other pixels in the bad pixel's kernel. The pixel value for P1 can be adjusted with the average of pixel values for P9 and P10. The pixel value for P2 can be adjusted with the average of pixel values for P9, P10, P11, and P12. The pixel value for P3 can be adjusted with the average of pixel values for P12 and P14. The pixel value for P4 can be adjusted with the average of pixel values for P14, P15, and P16. The pixel value for P5 can be adjusted with the average of pixel values for P16 and P18. The pixel value for P6 can be adjusted with the average of pixel values for P18, P19, and P20. The pixel value for P7 can be adjusted with the average of pixel values for P20 and P22. The pixel value for P8 can be adjusted with the average of pixel values for P9, P22, and P23. The pixel value for P13 can be adjusted with the average of pixel values for P12, P14, P30, P31, and P32. The pixel value for P17 can be adjusted with the average of pixel values for P16, P18, P36, P37, and P38. The pixel value for P21 can be adjusted with the average of pixel values for P20, P22, P42, P43, and P44. The pixel value for P24 can be adjusted with the average of pixel values for P9, P22, P23, P25, and P47. The pixel value for P48 can be adjusted with the average of pixel values for P9, P23, P25, and P47.

In an embodiment, the adaptive pixel replacement technique can implement a pixel replacement technique as a default pixel replacement technique (e.g., spiral search pixel replacement technique, local average pixel replacement technique, etc.). In an embodiment, when the number of bad pixels in a kernel is above a certain threshold, so that the number of good pixels is below a certain threshold, a pixel replacement technique other than the local pixel average technique can be implemented.

Figures 12A, 12B:
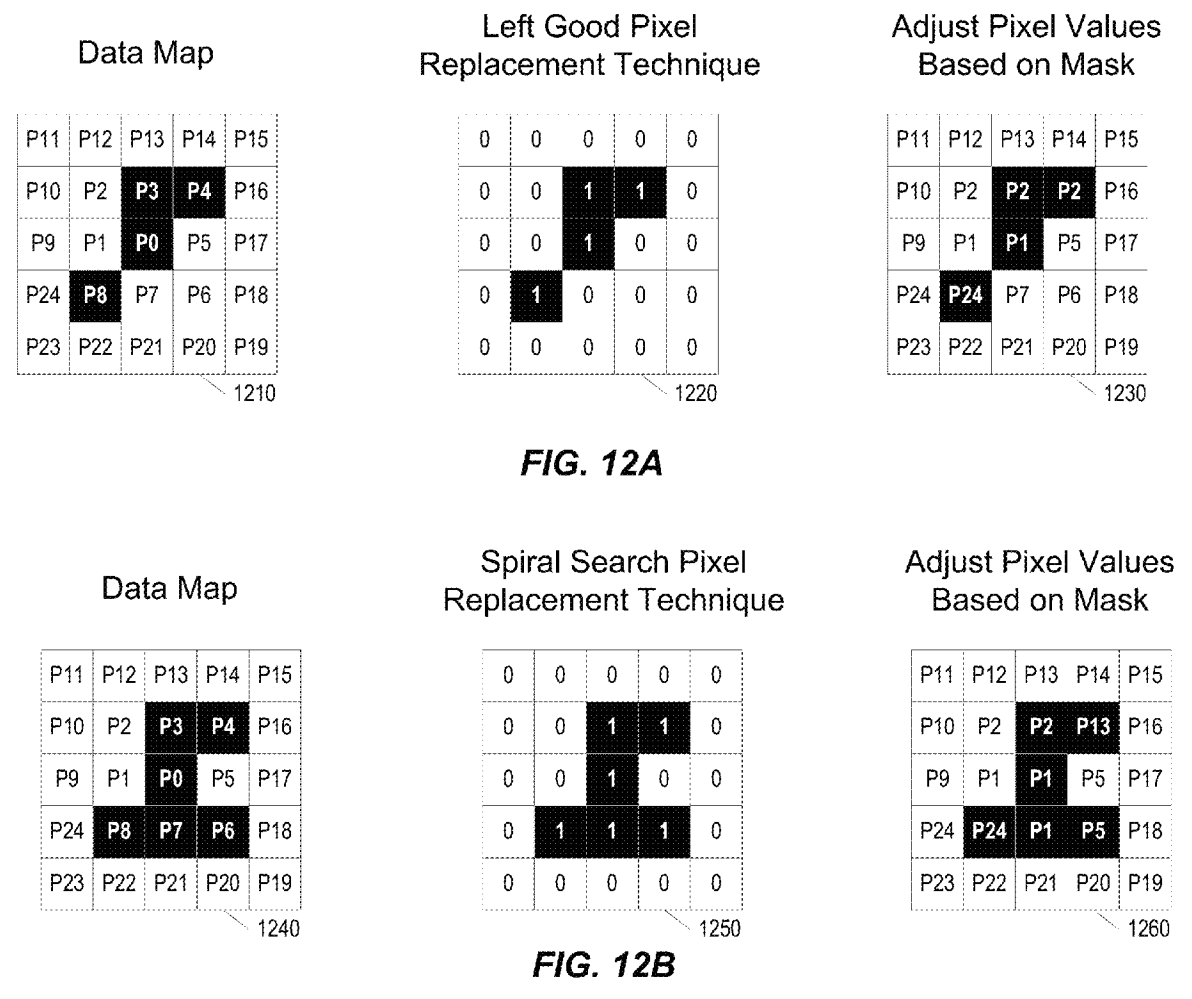

FIG. 12A is a high level schematic diagram illustrating a left good pixel replacement technique according to an embodiment of the present invention. As illustrated in FIG. 12A, a data map 1210 is obtained. The data map 1210 can include several bad pixels, including P0, P3, P4, and P8. The pixels shown in the data map 1210 can be an image frame and the kernel size can be a 3-by-3 kernel size.

The left good pixel technique is assigned as the pixel replacement technique for each of the bad pixels in the data map. As illustrated, the adaptive pixel replacement mask 1220 identifies the left good pixel technique as the pixel replacement technique for each of the bad pixels. In this example, the pixel locations for P0, P3, P4, and P8 have been changed to 1, which can represent a bad pixel, and the other pixel locations have been changed to 0, which can represent a good pixel. In an embodiment, the number 1 in the pixel replacement mask may trigger a pixel replacement for that pixel.

The pixel values are adjusted using the left good pixel technique to generate an output frame 1230. For example, the left good pixel technique may analyze the pixel to the left of a bad pixel to determine if that pixel is a good pixel. If so, the left good pixel technique can replace the pixel value for the bad pixel with the pixel value for the pixel to the left. When the pixel to the left is bad also, the left good pixel technique may recursively look to the left of the bad pixel to find a sufficient replacement. In this example, the pixel value for P0 has been adjusted to the pixel value for P1, the pixel values for P3 and P4 has been adjusted to the pixel value for P2, and the pixel value for P8 has been adjusted to the pixel value for P24.

In an embodiment, the left good pixel may not allow a left column to wrap around, so a bad pixel group originating from a left-most column may not have a solution based on the left good pixel technique. For example, a large row may remain as bad pixels if the left-most pixel is bad. In some cases, larger areas of the same value can be noticeable. In an embodiment, a bad pixel with no solution based on the left good pixel technique can be replaced with gray, zero, other non-informational value, or a default pixel replacement technique (e.g., spiral search).

In an embodiment, the right good pixel technique can be similar to the left good pixel technique, and also be used in the adaptive pixel replacement. For example, the right good pixel technique may analyze the pixel to the right of a bad pixel to determine if that pixel is a good pixel. If so, the right good pixel technique can adjust the pixel value for the bad pixel with the pixel value for the pixel to the right. When the pixel to the right is bad also, the right good pixel technique may recursively look to the right of the bad pixel to find a sufficient replacement.

FIG. 12B is a high level schematic diagram illustrating a spiral search pixel replacement technique according to an embodiment of the present invention. The spiral search may be a clockwise or counter-clockwise spiral search pixel replacement technique. As illustrated in FIG. 12B, a data map 1240 is obtained. The data map 1240 can include several bad pixels, including P0, P3, P4, P6, P7, and P8. The pixels shown in the data map 1240 can be an image frame and the kernel size can be a 3-by-3 kernel size.

The spiral search pixel replacement technique is assigned as the pixel replacement technique for each of the bad pixels in the data map. As illustrated, the adaptive pixel replacement mask 1250 identifies the spiral search pixel replacement technique as the pixel replacement technique for each of the bad pixels. In this example, the pixel locations for P0, P3, P4, P6, P7, and P8 have been changed to 1, which can represent a bad pixel, and the other pixel locations have been changed to 0, which can represent a good pixel. In an embodiment, the number 1 in the pixel replacement mask may trigger a pixel replacement for that pixel.

The pixel values are adjusted using the spiral search pixel replacement technique to generate an output frame 1230. The spiral search pixel replacement technique can look to the left of the bad pixel, and if that pixel is good, take the value from that pixel. If the left pixel is not good, the clockwise spiral search can follow the pixels in the kernel (e.g., 3×3) in a clockwise direction to find a good pixel. For example, after the pixel to the left of the bad pixel, the clockwise spiral search technique can analyze the pixel directly above the left pixel, then the pixel to the right of that pixel, and so on. The bad pixel can be replaced with the information from the first good pixel the clockwise spiral search finds. When no good pixel is found in the kernel, the bad pixel may remain bad or the pixel value can be adjusted using a default pixel replacement technique. In an embodiment, a larger kernel may be used to allow for larger defects to be effectively substituted.

In this example, the pixel value for P0 has been adjusted to the pixel value for P1, the pixel value for P3 has been adjusted to the pixel value for P2, the pixel value for P4 has been adjusted to the pixel value for P13, the pixel value for P6 has been adjusted to the pixel value for P5, the pixel value for P7 has been adjusted to the pixel value for P1, and the pixel value for P8 has been adjusted to the pixel value for P24.

In an embodiment, the spiral search pixel replacement technique may not allow a center-most bad pixel to be replaced when each of the pixels in the kernel around the center-most pixel are also bad. This can cause an undefined area after a single pixel replacement technique. The method may increase the kernel size and/or choose a second pixel replacement technique (e.g., default technique).

FIG. 12C is a high level schematic diagram illustrating a local average pixel replacement technique according to an embodiment of the present invention. As illustrated in FIG. 12C, a data map 1270 is obtained. The data map 1270 can include several bad pixels, including P0, P3, P4, and P8. The pixels shown in the data map 1270 can be an image frame and the kernel size can be a 3-by-3 kernel size.

The local average pixel replacement technique is assigned as the pixel replacement technique for each of the bad pixels in the data map. As illustrated, the adaptive pixel replacement mask 1280 identifies the local average pixel replacement technique as the pixel replacement technique for each of the bad pixels. In this example, the pixel locations for P0, P3, P4, and P8 have been changed to 1, which can represent a bad pixel, and the other pixel locations have been changed to 0, which can represent a good pixel. In an embodiment, the number 1 in the pixel replacement mask may trigger a pixel replacement for that pixel.

The pixel values are adjusted using the local average pixel replacement technique to generate an output frame 1290. The local pixel average can look to the kernel (e.g., 3×3) and determine the average of the values of good pixels in the kernel to use as the replacement value for the bad pixel. In this example, the pixel value for P0 has been adjusted to the pixel value for the average of P1, P2, P5, P6, and P7. The pixel value for P3 has been adjusted to the pixel value for the average of P1, P2, P12, P13, P14, and P15. The pixel value for P4 has been adjusted to the pixel value for the average of P13, P14, P15, P16, P17, and P5. The pixel value for P8 has been adjusted to the pixel value for the average of P24, P9, P1, P7, P21, P22, and P23.

In an embodiment, the local pixel average technique may not allow a center-most bad pixel to be replaced, which can cause an undefined area after a single pixel replacement technique. The method may increase the kernel size and/or choose a second pixel replacement technique (e.g., default technique).

Figure 13:
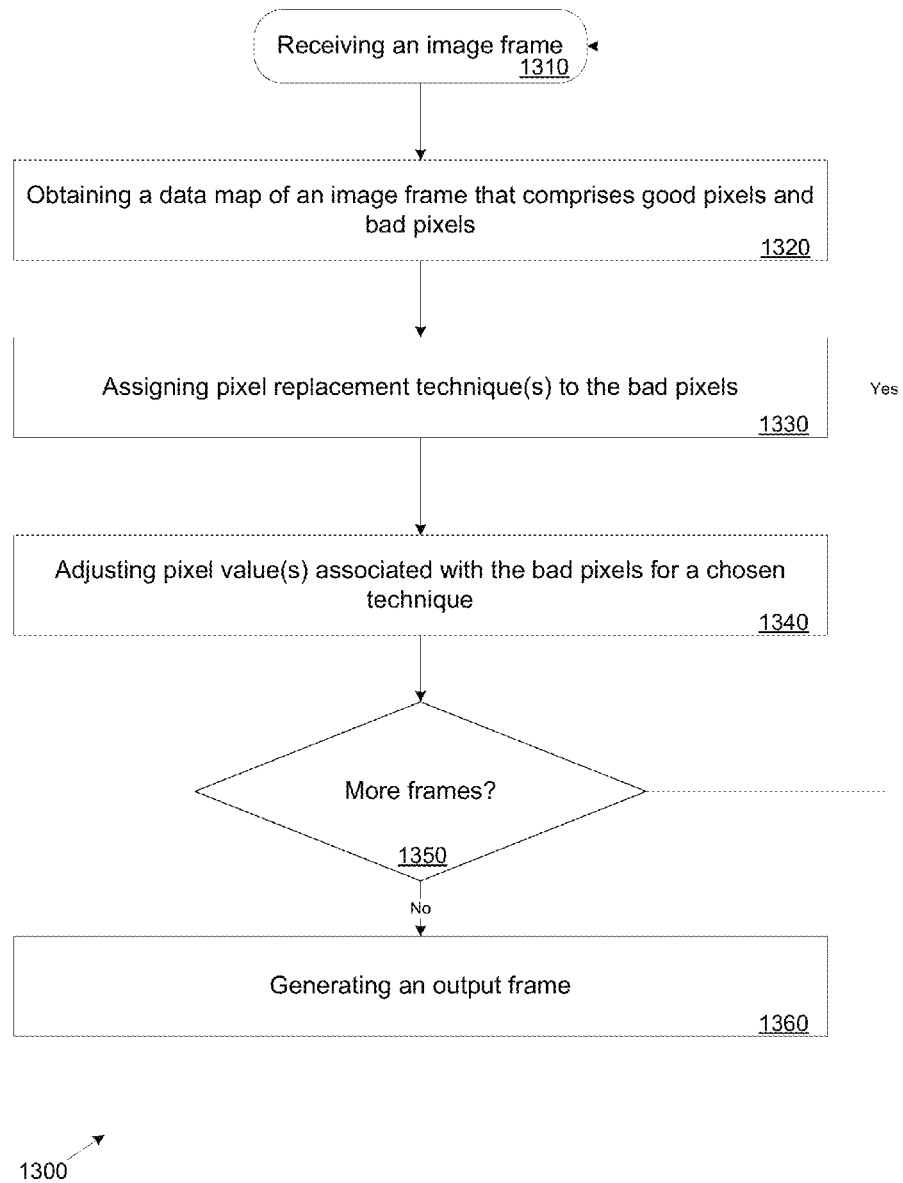
FIG. 13 is a high level flowchart illustrating a method of implementing an adaptive pixel replacement technique according to an embodiment of the present invention.

FIG. 13 is a high level flowchart illustrating a method of implementing an adaptive pixel replacement technique according to an embodiment of the present invention. As illustrated in FIG. 13, the method 1300 begins when an image frame is received at block 1310.

At block 1320, a data map of the image frame may be obtained that comprises good pixels and bad pixels. In some embodiments, the image frame is provided with the data map that comprises good pixels and bad pixels. The good and bad pixels may be at locations associated with the data map.

At block 1330, pixel replacement technique(s) are assigned to the bad pixels. A first technique can be assigned to a first bad pixel and a second technique can be assigned to a second bad pixel. In an embodiment, the first technique can be a local average technique and the second technique can be a spiral search technique.

At block 1340, pixel value(s) associated with the bad pixels may be adjusted using a pixel replacement technique.

At block 1350, the method 1300 may determine if more frames are received with the plurality of frames. If yes, the method may return to 1310 to receive more frames. If not, the method 1300 proceeds to block 1360.

At block 1360, an output frame is generated.

It should be appreciated that the specific steps illustrated in FIG. 13 provide a particular method of implementing an adjustable pixel replacement technique according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
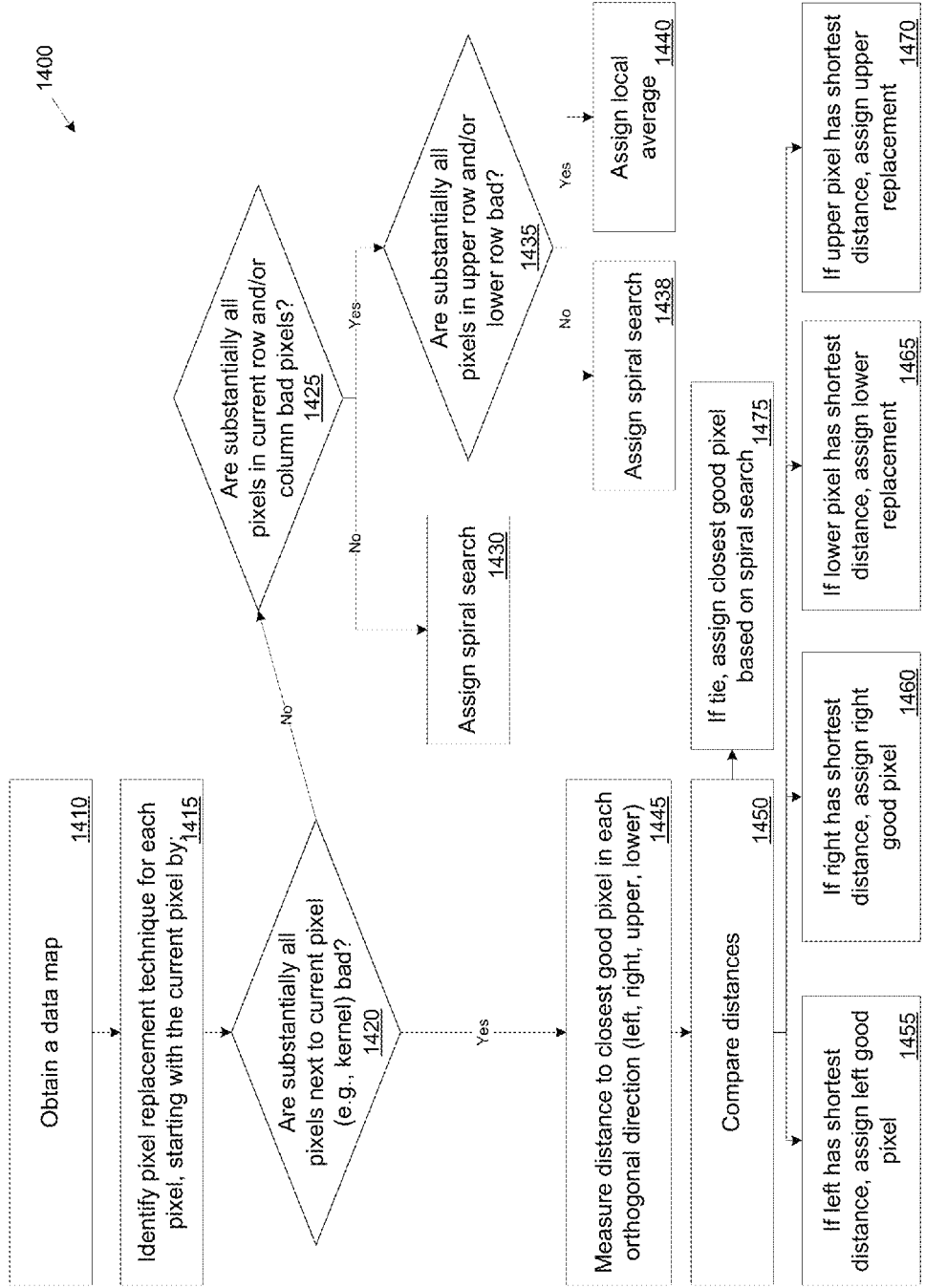
FIG. 14 is a high level flowchart illustrating a method of implementing an adaptive pixel replacement technique according to an embodiment of the present invention.

FIG. 14 is a high level flowchart illustrating a method of implementing an adaptive pixel replacement technique according to an embodiment of the present invention. As illustrated in FIG. 14, the method 1400 begins when a data map is obtained at block 1410.

At block 1415, a pixel replacement technique is identified for each pixel, starting with the current pixel. In an embodiment, the pixel replacement technique can be used to replace the image provided by a bad pixel with the image provided by the good pixel.

At block 1420, the method 1400 determines whether substantially all pixels next to the current pixel are bad. This determination may consider the pixels in the kernel (e.g., a 3×3 set of pixel locations, a 9×9 set of image locations, etc.). For example, if P0 is a bad pixel that should be replaced, the kernel is a 3-by-3 kernel, and surrounding pixels P1-P8 are also bad, the method may determine yes because none of the pixels in the kernel are good. If yes, the method 1400 proceeds to block 1445. If not, the method 1400 proceeds to block 1425.

At block 1425, the method 1400 determines whether substantially all pixels in the current row and/or column are bad. If yes, the method 1400 proceeds to block 1435. If not, the method 1400 proceeds to block 1430.

At block 1430, spiral search pixel replacement technique is assigned to the current pixel.

At block 1435, the method 1400 determines whether substantially all pixels in the upper row and/or lower row are bad. If yes, the method 1400 proceeds to block 1440. If not, the method 1400 proceeds to block 1438.

At block 1438, spiral search pixel replacement technique is assigned to the current pixel.

At block 1440, local average pixel replacement technique is assigned to the current pixel.

At block 1445, a distance is measured to the closest good pixel in each direction. The direction may be an orthogonal direction (e.g., left, right, upper, or lower). For example, if the next good pixel to the left direction is 3 pixels away and the next good pixel to the right direction is 2 pixels away, the method may determine that the right direction is the shortest distance to a good pixel.

At block 1450, the distances are compared. The determination from the comparison can determine which pixel replacement technique is assigned for the pixel. For example, if the left direction is the shortest distance to a good pixel, a left good pixel replacement technique is assigned to the current pixel (e.g., block 1455). If the right direction is the shortest distance to a good pixel, a right good pixel replacement technique is assigned to the current pixel (e.g., block 1460). If the lower direction is the shortest distance to a good pixel, a lower replacement technique is assigned to the current pixel (e.g., block 1465). If the upper direction is the shortest distance to a good pixel, an upper replacement technique is assigned to the current pixel (e.g., block 1470). If there is a tie to the shortest distance to a good pixel, one of the aforementioned pixel replacement techniques can be chosen, or a spiral search pixel replacement technique (e.g., block 1475).

It should be appreciated that the specific steps illustrated in FIG. 14 provide a particular method of determining a bad pixel replacement technique according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

IV. Example Subsystems or Components

Figure 15:
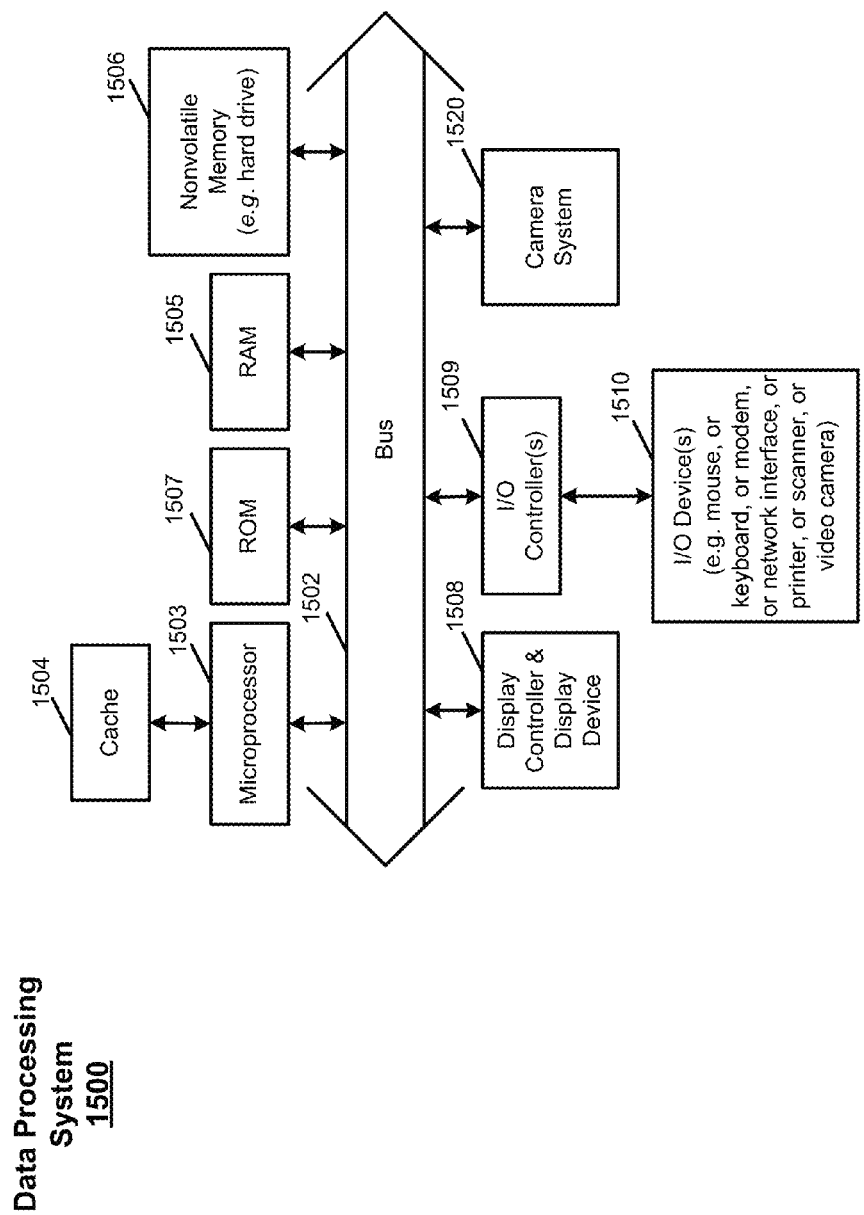
FIG. 15 is a high level schematic diagram illustrating a subsystem or component according to an embodiment of the present invention.

FIG. 15 is a high level schematic diagram illustrating a data processing system upon which the disclosed embodiments may be implemented in certain embodiments. Embodiments may be practiced with various computer system configurations such as infrared cameras, video cameras, hand-held devices, microprocessor systems, microprocessor-based or programmable user electronics, minicomputers, mainframe computers and the like. As an example, the data processing system can be used in conjunction with camera system 1520 as described throughout the present application, for example, providing for control of the imaging functions of the lens system. The embodiments can also be practiced in distributed computing environments where tasks are performed by remote processing devices that are linked through a wire-based or wireless network. FIG. 15 shows one example of a data processing system, such as data processing system 1500, which may be used with the present described embodiments. Note that while FIG. 15 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 15 may, for example, a personal computer (PC), workstation, tablet, smartphone or other hand-held wireless device, or any device having similar functionality.

As shown, the data processing system 1501 includes a system bus 1502 which is coupled to a microprocessor 1503, a Read-Only Memory (ROM) 1507, a volatile Random Access Memory (RAM) 1505, as well as other nonvolatile memory 1506. In the illustrated embodiment, microprocessor 1503 is coupled to cache memory 1504. System bus 1502 can be adapted to interconnect these various components together and also interconnect components 1503, 1507, 1505, and 1506 to a display controller and display device 1508, and to peripheral devices such as input/output ("I/O") devices 1510. Types of I/O devices can include keyboards, modems, network interfaces, printers, scanners, video cameras, or other devices well known in the art. Typically, 1/0 devices 1510 are coupled to the system bus 1502 through 1/0 controllers 1509. In one embodiment the I/O controller 1509 includes a Universal Serial Bus ("USB") adapter for controlling USB peripherals or other type of bus adapter.

RAM 1505 can be implemented as dynamic RAM ("DRAM") which requires power continually in order to refresh or maintain the data in the memory. The other nonvolatile memory 1506 can be a magnetic hard drive, magnetic optical drive, optical drive, DVD RAM, or other type of memory system that maintains data after power is removed from the system. While FIG. 15 shows that nonvolatile memory 1506 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 1500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of processing data for an image frame, the method comprising:
    receiving a plurality of input frames including a current frame;
    providing the current frame to a first multiplier, to a frame averaging module, and to a first low pass filter;
    after the current frame is provided to a first low pass filter, detecting at least a portion of the current frame that includes motion;

generating a mask frame associated with the portion of the current frame that includes the motion detection;

providing the mask frame to a second low pass filter;

after the current frame is provided to the frame averaging module, averaging the current frame and one or more stored frames to generate an averaged current frame;

providing the averaged current frame to a second multiplier; and generating an output frame based at least in part on the averaged current frame and the current frame after the first multiplier.

2. The method of claim 1 wherein the plurality of current frames includes one or more image frames from an input video stream.

3. The method of claim 1 wherein the first low pass filter is a temporal low pass filter and the second low pass filter is a spatial low pass filter.

4. The method of claim 1, further comprising:
after the mask frame is provided to the second low pass filter, generating a matrix of pixel values associated with motion in one or more pixels in the current frame, and providing the matrix of pixel values to the first multiplier.

5. The method of claim 4, further comprising:
providing the matrix of pixel values to an inverting module, wherein the inverting module inverts the polarity of the matrix of pixel values.

6. The method of claim 1 wherein averaging the current frame is implemented using an addition technique, an infinite impulse response (IIR) filter, or an alpha blend.

7. The method of claim 1 wherein the motion detection of the portion of the current frame is implemented by comparing the current frame with the one or more stored frames.

8. The method of claim 1, further comprising:
receiving the plurality of input frames from a user; and
providing the output frame to the user.

9. The method of claim 1 wherein the output frame is generated by combining the averaged current frame and the current frame after the first multiplier.

10. The method of claim 1 wherein the mask frame includes a rational number between 0 and 1 for a plurality of pixels in the current frame.

11. The method of claim 1 wherein at least three stored frames are averaged with the current frame to generate the averaged current frame.

12. A method of processing data for an image frame, the method comprising:

receiving a plurality of input frames including a current frame;

providing the current frame to a frame multiplexor, to a frame averaging module, and to a first low pass filter;

after the current frame is provided to a first low pass filter, detecting at least a portion of the current frame that includes motion;

generating a mask frame associated with the portion of the current frame that includes the motion detection;

providing the mask frame to a second low pass filter;

calculating a motion value associated with the mask frame;

comparing the motion value with a threshold;

averaging the current frame and one or more stored frames to generate an averaged current frame;

providing the averaged current frame to the frame multiplexor; and generating an output frame based at least in part on the averaged current frame and the current frame after the first multiplexor.

13. The method of claim 12 wherein the plurality of current frames includes one or more image frames from an input video stream.

14. The method of claim 12 wherein the first low pass filter is a temporal low pass filter and the second low pass filter is a spatial low pass filter.

15. The method of claim 12 wherein averaging the current frame is implemented using an addition technique, an infinite impulse response (IIR) filter, or an alpha blend.

16. The method of claim 12 wherein the motion detection of the portion of the current frame is implemented by comparing the current frame with the one or more stored frames.

17. The method of claim 12, further comprising:
receiving the plurality of input frames from a user; and
providing the output frame to the user.

18. The method of claim 12 wherein the output frame is generated by combining the averaged current frame and the current frame after the first multiplier.

19. The method of claim 12 wherein the mask frame includes a rational number between 0 and 1 for a plurality of pixels in the current frame.

20. The method of claim 12 wherein at least three stored frames are averaged with the current frame to generate the averaged current frame.

* * * * *